| United States Patent [19] | [11] Patent Number: 4,868,243 |
| --- | --- |
| Gelles et al. | [45] Date of Patent: Sep. 19, 1989 |

[54] HIGH IMPACT RESISTANT BLENDS OF THERMOPLASTIC POLYESTERS AND MODIFIED BLOCK COPOLYMERS

[75] Inventors: Richard Gelles; Carl L. Willis; Michael J. Modic, all of Houston, Tex.

[73] Assignee: Shell Oil Company, Houston, Tex.

[21] Appl. No.: 152,706

[22] Filed: Feb. 5, 1988

[51] Int. Cl.$^4$ .................. C08L 67/02; C08L 53/02
[52] U.S. Cl. .............................. 525/64; 525/92; 525/314; 525/366; 525/383; 525/386; 525/370
[58] Field of Search ............... 525/64, 92, 366, 383, 525/386, 314

[56] References Cited

U.S. PATENT DOCUMENTS

| 3,976,628 | 8/1976 | Halasa et al. | 525/366 |
| 4,588,765 | 5/1986 | Beaver | 525/92 |
| 4,628,072 | 12/1986 | Shiraki et al. | 525/66 |

*Primary Examiner*—Wilbert J. Briggs, Sr.

[57] ABSTRACT

A suber-toughened multiphase thermoplastic composition is provided by incorporating an effective amount of at least one functionalized, selectively hydrogenated alkenyl arene/conjugated diene block copolymer to which has been grafted an effective amount of carboxyl functional groups primarily in the alkenyl arene blocks thereof with poly (ethylene terephthalate). The carboxyl functional groups are present as carboxylic acids and their salts in an effective salt to acid ratio for super-toughening the composition. Additionally, the block copolymer phase has an effective phase size for super-toughening the composition.

43 Claims, 3 Drawing Sheets

HIGH IMPACT RESISTANT BLENDS OF THERMOPLASTIC POLYESTERS AND MODIFIED BLOCK COPOLYMERS

Cross-Reference to Related Applications

This is related to concurrently filed U.S. patent application Ser. No. 152,707 and to copending U.S. patent application Ser. No. 140,008, filed Dec. 31, 1987, now abandoned, which is a continuation-in-part of U.S. patent application No. 766,216, filed Aug. 16, 1985, now U.S. Pat. No. 4,797,447.

FIELD OF THE INVENTION

The present invention relates to an impact resistant polymeric composition. More particularly, it relates to an impact resistant polymeric composition comprising a polyester and a modified block copolymer. The copolymer is obtained by modifying a base block copolymer composed of a selectively hydrogenated conjugated diene polymer block and an alkenyl arene polymer block with a carboxyl containing functional group grafted primarily in the alkenyl arene block. These carboxyl groups may then be neutralized with a metal ion to vary the degree of impact modification on the polymeric composition.

BACKGROUND OF THE INVENTION

Thermoplastic polyesters, such as poly(1,4-butylene terephthalate) (PBT) and poly(ethylene terephthalate) (PET) are a class of materials which possess a good balance of properties comprising good elongation, high strength, high energy to break and stiffness which make them useful as structural materials. However, thermoplastic polyesters are quite sensitive to crack propagation. Consequently, a major deficiency of thermoplastic polyesters is their poor resistance to impact and their tendency to break in a brittle rather than ductile manner.

In general, improvements in the impact resistance of thermoplastic resins have been achieved by incorporating a low modulus rubber. Moreover, good dispersion of the rubber phase as well as developing adhesion between the rubber and matrix contribute to efficient impact modification of these resins.

It is well known to those skilled in the art that hydrogenated block copolymers of styrene and butadiene possess many of the properties useful for impact modification of plastics. These low modulus rubber materials display a low glass transition temperature, a characteristic advantage for optimum toughening at lower temperatures. Furthermore, these block copolymers contain little unsaturation which facilitates their blending with high processing temperature plastics without degradation of the elastomer phase.

Block copolymers are unique impact modifiers compared to other rubbers in that they contain blocks which are microphase separated over the range of applications and processing conditions. These polymer segments may be tailored to become miscible with the resin to be modified. Good particlematrix adhesion is obtained when different segments of the block copolymer reside in the matrix and in the rubber phase. This behavior is observed when hydrogenated block copolymers of styrene and butadiene are blended with resins such as polyolefins and polystyrene. Impact properties competitive with high impact polystyrene are obtained due to the compatibility of polystyrene with the polystyrene end-block of the block copolymer. Other polyolefins are toughened due to enhanced compatibility with the rubber segment.

Although the hydrogenated block copolymers do have many of the characteristics required for plastic impact modification, these materials are deficient as impact modifiers for many materials which are dissimilar in structure to styrene or hydrogenated butadiene. In particular, significant improvement in the impact resistance of polyesters with the addition of these hydrocarbon polymers has not been achieved. This result is due to poor interfacial interaction between the blend components and poor dispersion of the rubber particles. Poor interfacial adhesion affords areas of severe weakness in articles manufactured from such blends which when under impact result in facile mechanical failure.

The placement of functional groups onto the block copolymer may provide sites for interactions with such polar resins and, hence may extend the range of applicability of this elastomer. Such interactions, which include chemical reaction, hydrogen bonding and dipole interactions, are a route to achieving improved interfacial adhesion and particle dispersion, hence improved impact modification of polar thermoplastics.

Many attempts have been made to improve the impact properties of polyesters by adding low modulus modifiers which contain polar moieties as a result of polymerization or which have been modified to contain polar moieties by various grafting techniques. To this end, various compositions have been proposed utilizing such modifiers having carboxylic acid moieties and derivatives thereof, for example, Epstein in U.S. Pat. No. 4,172,859; Saito et al. in German Offenlegungsschrift 3,022,258 (published Jan. 8, 1981); and Shiraki et al. in U.S. Pat. Nos. 4,628,072 and 4,657,971.

Epstein discloses a broad range of low modulus polyester modifiers which have been prepared by free radical copolymerization of specific monomers with acid containing monomers. Alternatively, Epstein discloses the modification of polymers by grafting thereto specific carboxylic acid containing monomers. The grafting techniques allowed for therein are limited to thermal addition (ene reaction) and to nitrene insertion into C—H bonds or addition to C=C bonds (ethylenic unsaturation). Though Epstein does disclose a broad range of polyester modifiers, Epstein does not disclose or suggest the utilization of hydrogenated copolymers of alkenyl arenes and conjugated dienes nor, more particularly, modified selectively hydrogenated copolymers of alkenyl arenes and conjugated dienes as polyester modifiers.

Saito et al. disclose thermoplastic polyester compositions which contain a modified unsaturated aromatic vinyl compound/conjugated diene block copolymer as a polyester modifier. The unsaturated block copolymer has been modified by grafting a dicarboxylic acid group or derivative thereof (e.g. anhydride moieties) at a point of ethylenic unsaturation via thermal addition (ene reaction). However, such modifiers and compositions containing same are deficient in that the weatherability and resistance to thermal deterioration are poor; and, therefore, the polymers and compositions have been used only in the fields where such properties are not required. Furthermore, it is also noted that the ene reaction is a reversible reaction.

Shiraki et al. also describe a polyester composition containing a block copolymer similar to that of Saito et al. However, in order to improve the weatherability and resistance to heat aging, Shiraki et al. partially hydrogenate the block copolymer in their respective blends to an ethylenic unsaturation degree not exceeding 20 percent of the ethylenic unsaturation contained in the block copolymer prior to hydrogenation. Once the block copolymer is partially hydrogenated, the block copolymer is modified by grafting a molecular unit containing a carboxylic acid group and/or a group derived therefrom (e.g. anhydride moieties).

As is readily apparent in each of the foregoing prior art polyester compositions utilizing alkenyl arene/conjugated diene block copolymers as polyester modifiers, improved impact modification of the particular polyester is achieved via specific interactions, between the modified diene block and the polyester.

On the otherhand, Gergen et al., in the copending U.S. patent application Ser. No. 766,216 now U.S. Pat. No. 4797447, describe a polyester composition containing a block copolymer which is a thermally stable, modified, selectively hydrogenated, high 1,2 content alkenyl arene/conjugated diene block copolymer grafted with at least one functional group utilizing the metalation process. Therein, the functional groups are grafted primarily in the alkenyl arene block. In this composition, interactions between the polyester and rubber are achieved via the alkenyl arene block.

Further research and experimentation on polyester compositions containing the modified block copolymers of Gergen et al. in copending U.S. patent application Ser. No. 766,216 have yielded unexpected and significant impact property improvements. These new polyester blend compositions contain block copolymers having the carboxyl functional groups present in either or any of their acid, ester and neutralized metal carboxylate salt forms. Whether either or any of these forms in combination produce improvements may be dependent on the particular polyester(s) selected. Furthermore, the impact properties are also improved by increasing the degree of carboxyl functionality.

To those skilled in the art, the degree to which the grafting reaction and particle size reduction occur, thereby promoting interfacial adhesion, together with the dispersion of the rubber within the blend typically contribute to impact toughening of the blend. The results herein demonstrate that functionalizing the alkenyl arene segment promotes covalent bonding or a strong interaction between the modified block copolymer and the polyester. Furthermore, the block copolymer also becomes well dispersed in the polyester phase.

In the compositions disclosed herein, ionic crosslinking is present within the alkenyl arene block domains within the modifier present in the polyester blend composition. The function of the ionic crosslinking within the modifier phase is not entirely understood as it pertains to the properties of the blend composition.

The neutralization effect herein is to be distinguished from ionic crosslinking as is disclosed in Rees, U.S. Pat. No. 3,264,272; Saito et al., U.S. Pat. No. 4,429,076; and Gergen et al., U.S. Pat. No. 4,578,429. Rees and Gergen et al. ('429) utilize ionic crosslinking solely to improve the properties of the pure hydrocarbon polymer as opposed to improving the properties of polyester blend compositions.

Rees is limited to ionic crosslinking in homopolymer systems in which the carboxyl groups are distributed throughout the homopolymer molecule. As such, Rees does not deal with copolymers and resulting alkenyl arene domain formation. On the otherhand, though Gergen et al. ('429) addresses block copolymers, the carboxyl groups are distributed throughout the elastomeric diene block rather than the alkenyl arene blocks.

Saito et al. utilize ionic crosslinking to improve the properties of modified block copolymer which are to be blended with a thermoplastic polymer having a polar group thereby improving the impact resistance and hardness of the blend. In Saito et al., the block copolymer is modified by grafting maleic anhydride onto the conjugated diene portion thereof.

Saito et al. utilize ionic crosslinking to improve the properties of modified block copolymer which are to be blended with a thermoplastic polymer having a polar group thereby improving the impact resistance and hardness of the blend. In Saito et al., the block copolymer is modified by grafting maleic anhydride onto the conjugated diene portion thereof.

SUMMARY OF THE INVENTION

According to the present invention, there is provided a super-toughened multiphase thermoplastic composition comprising poly(ethylene terephthalate) and a modified alkenyl arene/conjugated diene block copolymer wherein an effective amount of carboxyl functional groups for super-toughening the multiphase thermoplastic composition are grafted to the block copolymer primarily in the alkenyl arene block. It has been surprisingly found that the existence of the carboxylic acid and carboxylate salt (neutralized, e.g. —COOLi) forms of the carboxyl functional groups either singly as acids or in combination produces significant improvements in the impact properties of the overall blend. Furthermore, the composition is super-toughened by a modified block copolymer having an effective phase size for super-toughening, preferably in the range of about 0.2 μm to about 0.5 μm, and being adhered to the polyester.

More particularly, there is provided a super-toughened multiphase thermoplastic composition comprising:

(a) one phase containing a thermoplastic polyester; said polyester being poly(ethylene terephthalate); and (b) at least one other phase containing an effective amount of at least one functionalized, selectively hydrogenated block copolymer for super-toughening said composition, (c) said functionalized block copolymer having grafted thereto on the average an effective amount of carboxyl functional groups for super-toughening said composition, (d) said carboxyl functional groups being present as carboxylate salts and carboxylic acids in an effective ratio of salt to acid for super-toughening said composition, (e) said at least one other phase having an effective phase size for super-toughening said composition, and (f) said functionalized block copolymer comprising
  (1) a base block copolymer which comprises
    (i) at least one polymer block A, said A block being predominantly a polymerized alkenyl arene block, and
    (ii) at least one selectively hydrogenated polymer block B, said B block prior to hydrogenation being predominantly a polymerized conjugated diene block,
  (2) wherein substantially all of said carboxyl functional groups are grafted to said base block copolymer on said A blocks.

The functionalized block copolymer is preferably characterized as having been prepared by the process which comprises metalating the base block copolymer, and
reacting the resulting metalated base block copolymer with effective amounts of at least one graftable electrophilic molecule containing at least one of said carboxyl functional groups or with effective amounts of an electrophile, wherein the electrophile is carbon dioxide, thereby preparing the functionalized block copolymer.

Furthermore, the functionalized block copolymer may be linear or branched, with the term "branched" also including symmetric or asymmetric radial and star structures.

The effective amount of the at least one functionalized block copolymer for super-toughening the composition is preferably from about 15 to about 50 percent by weight, more preferably from about 15 to about 40 percent by weight and yet more preferably from about 15 to about 30 percent by weight based on (a) plus (b) above.

The effective amount of carboxyl functional groups for super-toughening the composition is on the average at least about 0.25% w carboxyl functional groups based on the base block copolymer. It is presently believed that the addition of about one (1) carboxyl functional group per aromatic ring of the A blocks is limiting. Preferably, the carboxyl functional groups grafted to the functionalized block copolymer are present from about 0.25% w to about 20.0% w, more preferably from about 0.25% w to about 10.0% w and yet more preferably from about 0.25% w to about 5.0% w, based on said base block copolymer.

The effective phase size of the at least one functionalized block copolymer for super-toughening the composition is preferably from about 0.2 μm to about 0.5 μm.

The effective ratio of salt to acid for super-toughening the composition is preferably from about 0:100 to about 95:5, more preferably from about 0:100 to about 90:10 and yet more preferably from about 0:100 to about 80:20.

The carboxylate salts are preferably metal carboxylate salts. The metal carboxylate salts may be obtained by ionizing the carboxyl functional groups by neutralization with metal ions having a positive valence state. The metal ions may be selected from the group consisting of uncomplexed and complexed metal ions. Preferably, the metal ions have a positive ionized valence state of from one to three inclusive, more preferably monovalent metal ions.

Preferably, there is provided the super-toughened multiphase thermoplastic composition as defined above, wherein (a) each of the A blocks prior to hydrogenation is predominantly a polymerized monoalkenyl monocyclic arene block having an average molecular weight of about 1,000 to about 125,000, preferably about 1,000 to about 60,000, (b) each of the B blocks prior to hydrogenation is predominantly a polymerized conjugated diene block having an average molecular weight of about 10,000 to about 450,000, preferably about 10,000 to about 150,000, (c) the A blocks constitute between about 1 and about 99, preferably between about 2 and about 60, and more preferably between about 2 and 40, percent by weight of the copolymer, (d) the unsaturation of the B blocks is less than about 10 percent, preferably less than about 5 percent and more preferably at most 2 percent, of the original unsaturation of the B blocks, (e) the unsaturation of the A blocks is greater than about 50 percent, preferably greater than about 90 percent, of the original unsaturation of the A blocks, and (f) the carboxyl functional group is preferably present on the average from about 0.25% w to about 20.0% w and more preferably on the average from about 0.25% w to about 10.0% w and yet more preferably on the average from about 0.25% w to about 5.0% w based on said base block copolymer.

Thus, although improvements may be obtained throughout the range of functionality levels and salt to acid ratios of 100:0 to 0:100, super-tough blends may be attainable by incorporating (1) an effective amount of the modified block copolymer which in turn contains (2) an effective amount of carboxyl functional groups and (3) an effective salt to acid ratio within these ranges together with (4) an effective phase size of the block copolymer within the polyester. The effective ranges of these four (4) variables are dependent on the specific polyester chosen and may be easily determined on a polyester by polyester basis as demonstrated herein.

A feature of this invention lies in providing polymeric compositions which are processable in the melt and/or in solution and have improved mechanical properties, such as impact resistance.

Another feature of this invention lies in providing polymeric compositions which are considered super-tough.

Accordingly, those and other features and advantages of the present invention will become apparent from the following detailed description.

IN THE DRAWINGS

DETAILED DESCRIPTION OF THE INVENTION

Polyesters

Figure 1:
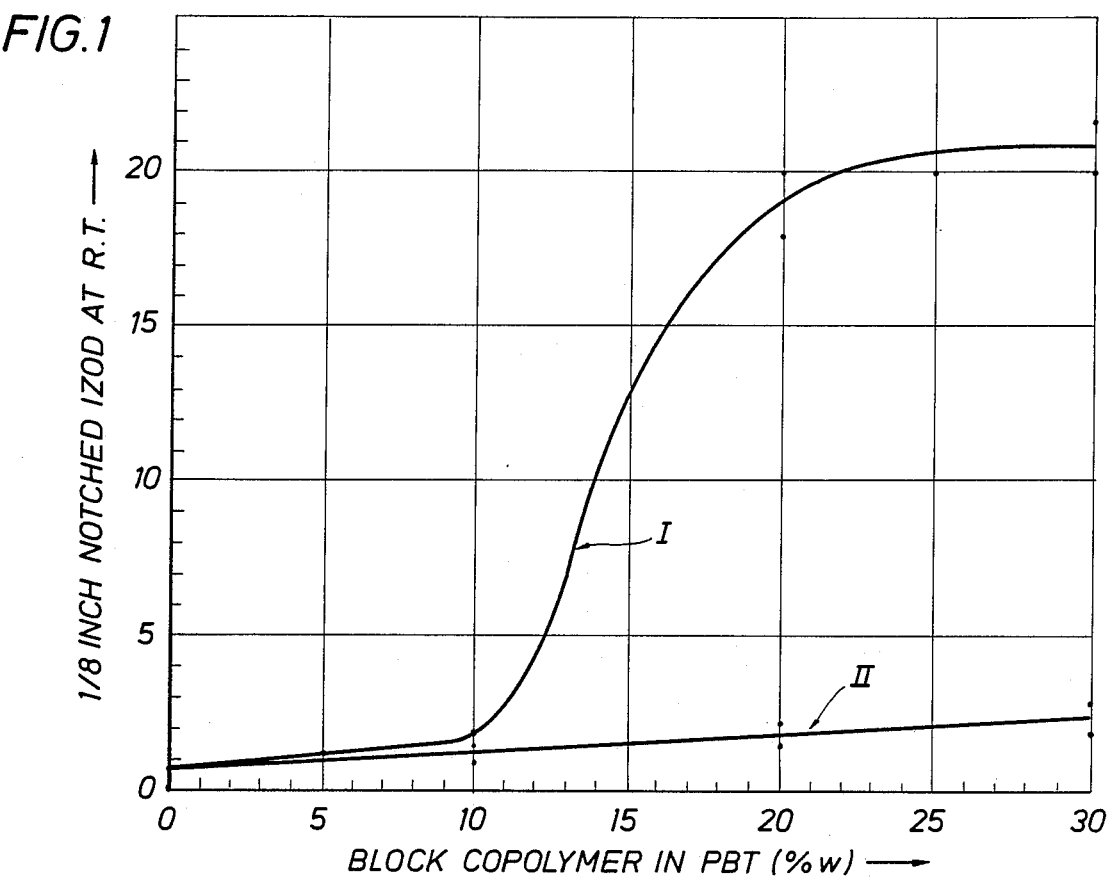
FIG. 1 is an x-y plot of ⅛ inch notched izod at room temperature (ft. lb./in.) versus % w block copolymer in a PBT blend.

The thermoplastic polyesters employed in the present invention include polyesters having a recurring ester linkage in the molecule, for example, polylactones, and polyesters having a structure formed by polycondensation of a dicarboxylic acid with a glycol, for example, polyalkylene arylates. The polyesters have a generally crystalline structure with a melting point over 120° C. or are generally amorphous with a glass transition temperature above 25° C., and are thermoplastic as opposed to thermosetting. The number average molecular weight of the polyesters is generally between 5000 to 100,000 and preferably 10,000 to 50,000.

One particularly useful group of polyesters are those thermoplastic polyesters having a structure formed by polycondensation of a dicarboxylic acid with a glycol. These polyesters may be prepared according to methods well known in the art such as by direct esterification or ester exchange reaction of a dicarboxylic acid or the lower alkyl ester, acid halide, or anhydride derivatives thereof with a glycol.

Among the dicarboxylic acids suitable for preparing polyesters useful in the present invention are those having from 2 to about 25 carbon atoms inclusive, preferably of up to 15 carbon atoms inclusive. The dicarboxylic acids may be aliphatic containing hydrocarbyl groups such as alkylene, alkylidene, cycloalkylene, and cycloalkylidene. The hydrocarbyl groups may contain unsaturation as in carbon-carbon multiple bonds and may be substituted such as an arylaliphatic containing an aryl substituent on an otherwise aliphatic molecule. Examples of suitable aliphatic dicarboxylic acids are oxalic acid, malonic acid, succinic acid, glutaric acid, adipic acid, suberic acid, azelaic acid and sebacic acid. The dicarboxylic acids may also be aromatic having at least one aromatic ring, preferably up to two aromatic rings, and the aromatic rings may contain hydrocarbyl substituents. Where the aromatic dicarboxylic acid contains more than one aromatic ring, the rings may be connected by carbon-carbon bonds, by hydrocarbyl bridging groups such as alkylene or alkylidene groups, or by other bridging groups such as oxo, thio and sulfone. Examples of suitable aromatic dicarboxylic acids are terephthalic acid, isophthalic acid, orthophthalic acid, 1,5-naphthalenic dicarboxylic acid, 2,5-naphthalenic dicarboxylic acid, 2,6-naphthalenic dicarboxylic acid, 2,7-naphthalenic dicarboxylic acid, 4,4'biphenyldicarboxylic acid, 4,4'dicarboxydiphenylsulfone, 4,4'dicarboxydiphenylmethane, 4,4'-dicarboxydiphenylpropane, and 4,4'-dicarboxydiphenyloctane. Also suitable for use in the invention are dicarboxylic acids having both an aliphatic carboxylic acid moiety and an aromatic carboxylic acid moiety wherein the two acid moieties are connected by carbon-carbon bonds, by hydrocarbyl bridging groups such as alkylene or alkylidene groups, or by other bridging groups such as an oxo group. Examples of such suitable dicarboxylic acids are 4-carboxyphenylacetic acid, 4-carboxyphenoxyacetic acid, 4-carboxyphenoxypropionic acid, 4-carboxyphenoxybutyric acid, 4-carboxyphenoxyvaleric acid, 4-carboxyphenoxyhexanoic acid and $\beta$-(2-alkyl-4-carboxyphenoxy)propionic acids. Mixtures of dicarboxylic acids can also be employed. Terephthalic acid is particularly preferred.

The glycols suitable for preparing the polyesters useful in the present invention include polyhydric alcohols of 2 to about 12 carbon atoms, preferably dihydric alcohols (diols) such as alkylene glycols and aromatic glycols and dihydroxy ethers. Examples of suitable alkylene glycols are the straight chain alkylene glycols such as ethylene glycol, 1,3-propylene glycol, 1,4-butylene glycol, 1,6-hexylene glycol, 2-methyl-1,3-propanedial, 1,10-decamethylene glycol, and 1,12-dodecamethylene glycol. Other suitable alkylene glycols are alicyclic diols such as 1,4-cyclohexane dimethanol. Aromatic glycols can be substituted in whole or in part. Suitable aromatic glycols include aromatic dihydroxy compounds such as p-xylylene glycol, pyrocatechol, resorcinol, hydroquinone, and alkyl-substituted derivatives of these compounds. Suitable dihydroxy ethers include diethylene glycol and triethylene glycol. Preferred glycols are the straight chain alkylene glycols, more preferred are the straight chain alkylene glycols having 2 to 4 carbon atoms.

A preferred group of these polyesters are the poly(alkylene arylates), in particular the poly(alkylene terephthalates) such as the crystalline copolymers poly(ethylene terephthalate), poly(propylene terephthalate) and poly(butylene terephthalate).

Poly(alkylene terephthalates) may be formed by the polycondensation of an alkylene glycol and dimethylterephthalate or terephthalic acid. When straight-chained alkylene glycols are utilized, the poly(alkylene terephthalates) have the generalized formula:

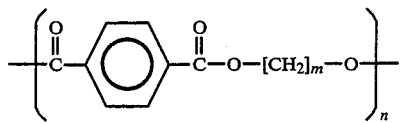

where m is the number of carbon atoms in the straight-chained alkylene glycol utilized and n varies from 70 to 280. For example, ethylene glycol (m=2) is utilized in forming poly(ethylene terephthalate); 1,3-propylene glycol (m=3) is utilized in forming poly(propylene terephthalate); and 1,4-butylene glycol (m=4) is utilized in forming poly(butylene terephthalate). The molecular weight of these poly(alkylene terephthalates) typically varies from about 20,000 to about 50,000. A suitable process for manufacturing these polymers is disclosed in U.S. Pat. No. 2,465,319 and in British Pat. No. 1,305,130, which are incorporated herein by reference.

Commercially available poly(ethylene terephthalate) and poly(butylene terephthalate) are available from General Electric (GE) under the tradename VALOX® thermoplastic polyester. Other commercial polymers include CELANEX® from Celanese, TENITE® from Eastman Kodak, and VITUF® (PBT) and CLEARTUF® (PET) from Goodyear Chemical.

Another commercially available and suitable polyester is ARDEL® polyarylate available from Amoco, having repeating units of the formulae:

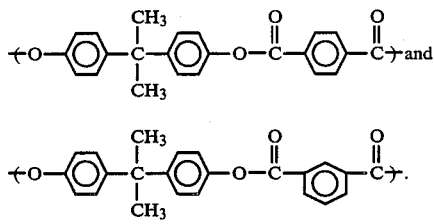

Another valuable group of thermoplastic polyesters which may be used in the present invention are polylactones. Polylactones have recurring ester structural units such as those obtained by ring opening polymerization of a cyclic lactone. Examples of suitable polylactones are poly(pivalolactone), poly($\beta$-propiolactone) and poly($\epsilon$-caprolactone).

Polypivalolactone is a linear polymer having recurring ester structural units mainly of the formula:

—[—CH$_2$—C(CH$_3$)$_2$C(O)O—]— i.e., units derived from pivalolactone. Preferably the polyester is a pivalolactone homopolymer. Also included, however, are the copolymers of pivalolactone with not more than 50 mole percent, preferably not more than 10 mole percent of other beta-propiolactones, such as beta-propiolactone; alpha, alpha-diethyl-beta-propiolactone; and alpha-methyl-alpha-ehtyl-beta-propiolactone. The term "beta-propiolactones" refers to beta-propiolactone (2-oxetanone) and to derivatives thereof which carry no substituents at the beta-carbon atom of the lactone ring. Preferred beta-propiolactones are those containing a tertiary or quaternary carbon atom in the alpha position relative to the carbonyl group. Especially preferred are the alpha, alpha-dialkyl-beta-propiolactones wherein each of the alkyl groups independently has from one to four carbon atoms. Examples of useful monomers are: alpha-ethyl-alpha-methyl-beta-propiolactone, alpha-methyl-alpha-isopropyl-beta-propiolactone, alpha-ethyl-alpha-n-butyl-beta-propiolactone, alpha-chloromethyl-alpha-methyl-beta-propiolactone, alpha, alpha-bis(chloromethyl)-beta-propiolactone, and alpha, alpha-dimethyl-beta-propiolactone (pivalolactone). See generally U.S. Pat. Nos. 3,259,607; 3,299,171; and 3,579,489 which are incorporated herein by reference. These polypivalolactones have a molecular weight in excess of 20,000 and a melting point in excess of 120° C.

Another useful polyester which may be obtained from a cyclic lactone is polycaprolactone. Typical poly(ε-caprolactones) are substantially linear polymers in which the repeating unit is (—O—CH$_2$—CH$_2$—CH$_2$—CH$_2$—CH$_2$—$\overset{\text{O}}{\overset{\|}{\text{C}}}$—).

These polymers have similar properties to the polypivalolactones and may be prepared by a similar polymerization mechanism. See generally U.S. Pat. No. 3,259,607.

Other useful polyesters include the cellulosics. The thermoplastic cellulosic esters employed herein are widely used as molding, coating and film-forming materials and are well known. These materials include the solid thermoplastic forms of cellulose nitrate, cellulose acetate (e.g. cellulose diacetate, cellulose triacetate), cellulose butyrate, cellulose acetate butyrate, cellulose propionate, cellulose tridecanoate, carboxymethyl cellulose, ethyl cellulose, hydroxyethyl cellulose and acetylated hydroxyethyl cellulose as described on pages 25-28 of Modern Plastics Encyclopedia, 1971-72, and references listed therein.

Linear and branched polyesters and copolyesters of glycols and terephthalic or isophthalic acid have been commercially available for a number of years and have been described in U.S. Pat. Nos. 2,465,319 and 3,047,539.

Thermoplastic polyesters, such as PBT and PET, are useful as injection moldable materials which can be formed into articles which exhibit a good balance of properties including strength and stiffness. However, an improvement in impact strength of these materials is desirable.

The amount of polyester included in the compositions of the present invention may vary widely depending upon the properties desired in the composition. For example, as great as 99 percent by weight of the composition may be composed of polyester. However, the amounts of poly(ethylene terephthalate) included in the "super-tough" compositions of the present invention range from about 50 to about 85 percent by weight based on (a) plus (b). Preferably, the amounts of PET are from about 50 to about 80 percent by weight with a more preferred amount being from about 50 to about 70 percent by weight, as these amounts appear to impart excellent impact resistance to the finished composition.

SELECTIVELY HYDROGENATED BLOCK COPOLYMER BASE POLYMER

The selectively hydrogenated block copolymers employed in the present invention may have a variety of geometrical structures, since the invention does not depend on any specific geometrical structure, but rather upon the chemical constitution of each of the polymer blocks, and subsequent modification of the block copolymer. The precursor of the block copolymers employed in the present composition are preferably thermoplastic elastomers and have at least one alkenyl arene polymer block A and at least one elastomeric conjugated diene polymer block B. The number of blocks in the block copolymer is not of special importance and the macromolecular configuration may be linear or branched, which includes graft, radial or star configurations, depending upon the method by which the block copolymer is formed.

Typical examples of the various structures of the precursor block copolymers used in the present invention are represented as follow:

(A—B)n
(A—B)n A
(B—A)n B
[(A—B)p]m X
[(B—A)p]m X
[(A—B)pA]m X
and
[(B—A)p B]m X wherein A is a polymer block of an alkenyl arene, B is a polymer block of a conjugated diene, X is a residual group of a polyfunctional coupling agent having two or more functional groups, n and p are, independently, integers of 1 to 20 and m is an integer of 2 to 20. Furthermore, the above-mentioned branched configurations may be either symmetrical or asymmetrical with respect to the blocks radiating from X.

It will be understood that both blocks A and B may be either homopolymer, random or tapered copolymer blocks as long as each block predominates in at least one class of the monomers characterizing the blocks defined hereinbefore. For example, blocks A may comprise styrene/alpha-methylstyrene copolymer blocks or styrene/butadiene random or tapered copolymer blocks as long as the blocks individually predominate in alkenyl arenes. The A blocks are preferably monoalkenyl arene. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene.

Preferably, the block copolymers of conjugated dienes and alkenyl arene hydrocarbons which may be utilized include any of those which are low in modulus relative to the respective polyester, preferably less than 1:10 (ratio of tensile modulus of block copolymer to tensile modulus of polyester) and those butadiene derived elastomers which have 1,2-microstructure contents prior to hydrogenation of from about 7 to about 100 percent, preferably from about 25 to about 65 percent, more preferably from about 35 to about 55 percent. Such block copolymers may contain various ratios of conjugated dienes to alkenyl arenes. The proportion of the alkenyl arene blocks is between about 1 and about 99 percent by weight of the multiblock copolymer, preferably between about 2 and about 60 percent, more preferably between about 2 and about 55 percent by weight and particularly preferable between about 2 and about 40 percent by weight. When the alkenyl arene content is not more than about 60 percent by weight, preferably not more than about 55 percent by weight, the precursor block copolymer has characteristics as a rubbery (soft) polymer; and when the alkenyl arene content is greater than about 60 percent by weight, preferably more than about 70 percent by weight, the precursor block copolymer has characteristics as a resinous polymer.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 10,000 to about 150,000. The total average molecular weight of the multiblock copolymer is typically in the order of about 12,000 to about 700,000, preferably from about 12,000 to about 270,000. These molecular weights are most accurately determined by gel permeation chromatography.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627, the disclosures of which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, the disclosures of which are incorporated herein by reference.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These polymers and copolymers are preferably hydrogenated to increase their thermal stability and resistance to oxidation. The hydrogenation of these polymers and copolymers may be carried out by a variety of well established processes including hydrogenation in the presence of such catalyst as Raney Nickel, noble metals such as platinum, palladium and the like, and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual ethylenic unsaturation content in the polydiene block of not more than about 20 percent, preferably not more than about 10 percent, most preferably not more than about 5 percent, of their original ethylenic unsaturation content prior to hydrogenation.

MODIFIED BLOCK COPOLYMERS

The modified block copolymers according to the present invention are preferably grafted or substituted in the alkenyl arene block by the metalation process as later described herein. Exemplary reactions are given below, utilizing an exemplary styrene unit from a polystyrene segment of a suitable block copolymer:

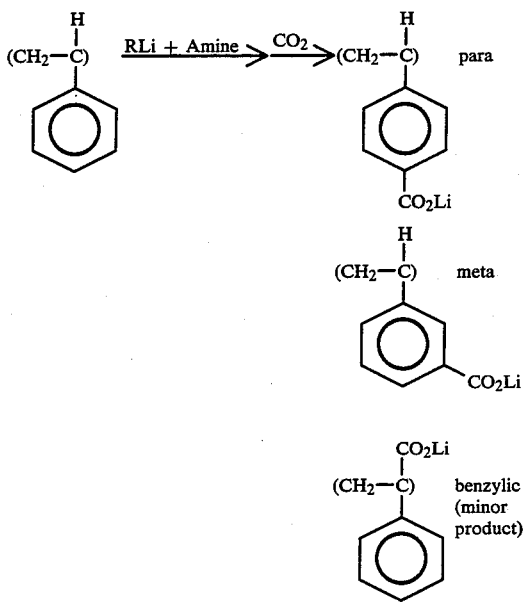

Where: RLi = Alkyl Lithium

The structure of the substituted block copolymer specifically determined by locating the functionality on the alkenyl arene block gives the block copolymer a substantially greater degree of thermal stability.

GRAFTABLE COMPOUNDS

In general, any materials having the ability to react with the metalated base polymer are operable for the purposes of this invention.

In order to incorporate functional groups into the metalated base polymer, electrophiles capable of reacting with the metalated base polymer are necessary. Reactants may be polymerizable or nonpolymerizable; however, preferred electrophiles are nonpolymerizable when reacted with metalated polymers such as those utilized herein.

The class of preferred electrophiles which will form graft polymers within the scope of the present invention include reactants from the following groups carbon dioxide, ethylene oxide, aldehydes, ketones, carboxylic acid derivatives such as their salts, esters and halides, epoxides, sulfur, boron alkoxides, isocyanates and various silicon compounds.

These electrophiles may contain appended functional groups as in the case of N,N-dimethyl-p-aminobenzaldehyde where the amine is an appended functional group and the aldehyde is the reactive electrophile. Alternatively, the electrophile may react to become the functional site itself; as an example, carbon dioxide (electrophile) reacts with the metalated polymer to form a carboxyl functional group. By these routes, polymers could be prepared containing grafted sites selected from one or more of the following groups of functionality type carboxylic acids, their salts and esters, ketones, alcohols and alkoxides, amines, amides, thiols, borates, anhydrides, and functional groups containing a silicon atom.

These functionalities can be subsequently reacted with other modifying materials to ultimately produce carboxyl functional groups appended thereon which are necessary for the impact modification effect observed and relied upon herein. In some cases, the reaction could take place simultaneously with the grafting process but in most examples it would be practiced in subsequent post modification reaction. The grafted carboxyl functional groups may be present as carboxylic acids, their salts and esters, and combinations thereof. Additionally, carboxyl functional groups in any of these forms may be further reacted with other modifying materials to convert from one form to another, thereby varying the relative proportions of each of these carboxylate forms to the others. For example, grafted carboxylic acid groups could be suitably modified by esterifying same by appropriate reaction with hydroxy-containing compounds of varying carbon atom lengths.

The effective amount of carboxyl functional groups for super-toughening the composition is on the average at least about 0.25% w carboxyl functional groups based on the base block copolymer. It is presently believed that the addition of about one (1) electrophile per aromatic ring of the A blocks is limiting. Thus, if carbon dioxide is used as the electrophile, this translates to about one (1) carboxyl group per aromatic ring. Therefore, the effective amount of carboxyl functional groups corresponds to from about an average of 0.25% w carboxyl functional groups based on the base block copolymer to about an average of one carboxyl functional group per aromatic ring of the A block, respectively. Preferably, the functionality level is on the average from about 0.25% w to about 20% w, more preferably on the average from about 0.25% w to about 10% w and yet more preferably on the average from about 0.25% w to about 5% w. As previously noted, it is currently believed that the average of one addition per aromatic ring is limiting. However, it still remains that the greater the degree of functionality (carboxyl group content) attained, the greater the improvement in impact properties.

NEUTRALIZATION OF MODIFIED BLOCK COPOLYMER

The carboxylic acid groups in the modified block copolymers of the present invention may then be "neutralized" by reacting the polymer with an ionizable metal compound to obtain a metal salt. The improvement in impact properties resulting from the blend of the polyester and the carboxylated block copolymer is greatly influenced by the type of polyester, by the degree of carboxyl functionalization in the block copolymer, and by the degree of neutralization thereof. For example, to obtain an optimum in the impact properties of a PET blend at a particular functionality level, the carboxylated block copolymer is preferably in the all acid form. On the other hand, to obtain an optimum in the impact properties of a PBT blend at a particular functionality level, the carboxylated block copolymer is preferably partially neutralized.

The metal ions which are suitable in forming the neutralized block copolymers of the present invention are mono-, di- and trivalent ions of metals in Groups IA, IB, IIA, IIB, IIIA, IIIB, IV and VIII, of the Periodic Table of Elements. These metal ions can be used alone or in any mixture thereof. Suitable monovalent metal ions are $Na^+$, $K^+$, $Li^+$, $Cs^+$, $Ag^+$, $Hg^+$ and $Cu^+$. Suitable divalent metal ions are $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$, $La^{+3}$ and $Y^{+3}$. Preferable metal containing compounds for neutralization of the carboxylated block copolymers herein are hydroxides, oxides, alcoholates, carboxylates, formates, acetates, methoxides, ethoxides, nitrites, carbonates and bicarbonates of the above-referenced metal ions.

The degree of carboxyl functionality and of neutralization may be measured by several techniques. For example, infrared analysis may be employed to determine the overall degree of functionality calculated from the changes resulting in the absorption bands associated with —COOH units. Additionally, the titration of a solution of the block copolymer with a strong base may be utilized to determine the degree of functionality and/or degree of neutralization (metal carboxylate salt content.) Neutralization as used herein is based on the percentage of carboxylate ions (—COO$^-$) as compared to the total carboxyl group functionality, i.e., carboxylic acid plus the carboxylate ions.

In general, it was found that the added metal ion reacts approximately stoichiometrically with the carboxyl functional groups (acid form) in the polymer up to about 80 percent neutralization. Thereafter, excess quantities of the metal compound are necessary to carry the neutralization to completion.

Thus, each of these carboxyl functional groups may be either in the carboxylic acid or ester form or ionized by neutralization with metal ions having a positive ionized valence state. For example, from 100 percent to 0 percent of the carboxyl functional groups may be in the acid form (—COOH); and, correspondingly, from 0 percent to 100 percent of the carboxyl functional groups may be in the salt form (neutralized, e.g. —COOLi).

PREPARATION OF THE MODIFIED BLOCK COPOLYMERS

The polymers may be prepared by any convenient manner. Preferably, the polymer is prepared such that the functional groups are incorporated into the block copolymer primarily on the aromatic portion of the alkenyl arene block via metalation.

Metalation may be carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the R' is usually a saturated hydrocarbon radical of any length whatsoever, but ordinarily containing up to 20 carbon atoms, and may also be a saturated cyclic hydrocarbon radical of e.g. 5 to 7 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product, metalated polymer alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly.

Generally, the lithium metalates the position allylic to the double bonds in an unsaturated polymer. In the metalation of polymers in which there are both olefinic and aromatic groups, the metalation will occur in the position in which metalation occurs most readily, as in positions (1) allylic to the double bond (2) at a carbon to which an aromatic is attached, (3) on an aromatic group, or (4) in more than one of these positions. In the metalation of saturated polymers having aromatic groups as is preferably the case herein, the metalation will occur primarily on an aromatic group and as a minor product at a carbon to which an aromatic is attached. In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example: (a) Chelating tertiary diamines, preferably those of the formula $R_2N—(CH_2)—_yNR_2$ in which each R can be the same or different, straight- or branched-chain alkyl group of any chain length containing up to 20 carbon atoms, or more, all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexylenediamine, tetra-(mixed alkyl) ethylene diamines, and the like. (b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like. (c) The useful bridgehead diamines include, for example, sparteine, triethylenediamine and the like.

Tertiary monoamines such as triethylamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to about 20:1. Solvents such as chlorinated hydrocarbons, ketones, and alcohols, should not be used because they destroy the lithiating compound.

Polar metalation promotors may be present in an amount sufficient to enable metalation to occur, e.g. amounts between about 0.01 and about 100 or more preferably between about 0.1 to about 10 equivalents per equivalent of lithium alkyl.

The equivalents of lithium employed for the desired amount of lithiation generally range from such as about .001 to about 3.0 per alkenyl arene hydrocarbon unit in the copolymer, presently preferably about 0.01 to about 1.0 equivalents per alkenyl arene hydrocarbon unit in the copolymer to be modified. The molar ratio of active lithium to the polar promoter can vary from such as about 0.01 to about 10.0. A preferred ratio is about 0.5 to about 2.0.

The amount of lithium alkyl employed can be expressed in terms of the lithium alkyl to alkenyl arene hydrocarbon molar ratio. This ratio may range from a value of 1 (one lithium alkyl per alkenyl arene hydrocarbon unit) to as low as $1 \times 10^{-3}$ (1 lithium alkyl per 1000 alkenyl arene hydrocarbon units).

The process of lithiation can be carried out at temperatures in the range of such as about $-70°$ C. to about $+150°$ C., presently preferably in the range of about 25° C. to about 75° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally, the time can range from a few seconds to about 72 hours, presently preferably from about 1 minute to about 1 hour.

GRAFTING STEP

The next step in the process of preparing the modified block copolymer is the treatment of the lithiated hydrogenated copolymer, in solution, without quenching in any manner which would destroy the lithium sites, with a species capable of reacting with a lithium anion. These species are selected from the class of molecules called electrophiles and must contain functional groups capable of undergoing nucleophilic attack by a lithium anion. As such, the modified block copolymer herein is the reaction product of an electrophile with an activated base (unmodified hydrogenated) block copolymer primarily at lithium anion sites on the aromatic substrates thereof, as opposed to the reaction product of an electrophile (strong Lewis acid) with an unactivated base block copolymer on the aromatic substrates thereof.

Such species will react to give polymer bound functional groups including but not limited to:

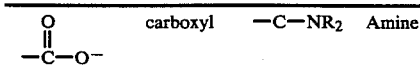

| | | | |
|---|---|---|---|
| —C—OH | hydroxyl | $\underset{\|}{O} \atop -C-NR_2$ | Amide |
| —C—OR | ether | —SH | Thiol |
| $\underset{\|}{O} \atop -C-R$ | ketone | —B(OR)$_2$ | Borane Containing |
| $\underset{\|}{O} \atop -C-H$ | aldehyde | $-\underset{\underset{R_3}{\|}}{\overset{\overset{R_1}{\|}}{Si}}-R_2$ | Silicon Containing |

If necessary, the process also includes further chemistry on the modified block copolymer to carboxylate same. The resulting carboxyl functional groups may then be easily converted from or to a carboxylic acid form or a neutralized metal carboxylate salt form. Whether the all acid or partially neutralized form is preferable to produce the greatest improvement in impact properties is dependent upon the polyester chosen for the blend. A simple Notched Izod toughness test (ASTM-256) on a test specimen (bar) molded from such blends is clearly indicative and within the skills possessed by one of ordinary skill in the art.

The desired degree of neutralization may be achieved by various methods. If the modified block copolymer is in an all acid form or in a partially neutralized form and additional neutralization is desired, neutralization is preferably carried out under conditions which allow for a homogeneous uniform distribution of the metal containing compound in the modified block copolymer. No particular reaction conditions are essential except that the conditions should preferably permit the removal of the neutralization product. More specifically, the neutralization reaction is preferably carried either (1) by adding the metal containing compound, directly or in solution, to a solution of the modified block copolymer and then, on neutralization, precipitating and separating the resulting polymer; or (2) by melt blending the block copolymer with the metal containing compound. The melt blending is preferably conducted at elevated temperatures to facilitate homogeneous distribution of the metal containing compound and to volatilize the neutralization product.

Alternatively, if the modified block copolymer is in an all neutralized salt form or in a partially neutralized form and additional acidification (i.e., reverse-neutralization) is desired, acidification is likewise preferably carried out under conditions which allow for a homogeneous uniform distribution of the acid in the modified block copolymer. The acid utilized is preferably an organic acid, for example acetic acid or citric acid. The resulting metal-salt acidification product may be harmful to the resulting modified block copolymer or blend incorporating same. Therefore, the metal salt may be removed by conventional means if so desired.

As an additional alternative, the all acid and the all neutralized salt forms of the block copolymer may be blended with each other or together with the desired polyester or polyesters by either the solution or melt blending method mentioned above, to achieve the desired degree of neutralization. It is to be understood, however, that the specific technique employed is not critical as long as it meets the requirements set forth above. The extent of the neutralization i.e., the degree to which the metal ion is linked with the carboxylate ion may be readily analyzed by titration methods.

It is not essential that the metal containing compound be added as such, but it is possible to form the metal containing compound in situ from components which react with each other in the desired manner in the polymer environment. Thus, it is possible to add a metal oxide to the all acid or partially neutralized block copolymer then add an acid such as acetic acid in the proper proportion and form the metal containing compound, i.e., the metal acetate, while the polymer is milled. The metal containing compound then neutralizes the block copolymer to the desired degree depending on the proportion of metal containing compound formed.

PREPARATION OF THE FINAL COMPOSITIONS

The toughened thermoplastic polymer compositions of the present invention can be readily prepared by using any conventional mixing apparatus which is normally used for mixing or blending of polymer substances. Examples of such apparatus are single or multiple screw extruders, mixing rollers, Brabender, Banbury mills, kneaders and the like. Alternatively, the blends may be made by coprecipitation from solution, blending or by dry mixing together of the components, followed by melt fabrication of the dry mixture by extrusion.

The polyester blends of the present invention may be prepared by melt-blending the desired proportion of polyester, ranging from about 50 percent to about 99 percent, with the desired proportion of the modified block copolymer, ranging from about 1 percent to about 50 percent. Taking economic and commercial considerations into account, the proportion of polyester preferably ranges from about 70 percent to about 95 percent, or most preferably ranges from about 70 percent to about 90 percent, with the modified block copolymer making up the difference in the polyester/block copolymer blend. However, to produce a super-toughened PET blend, the proportion of PET ranges from about 50 to about 85 percent, more preferably from about 50 to about 80 percent, and yet more preferred from about 50 to about 70 percent, by weight based on (a) plus (b).

The impact properties of the blends of this invention are improved as characterized by a higher notched Izod value over the polyester alone or in a blend with the base (unmodified hydrogenated) copolymer. The amount of functionality and the quantity of ions employed in the composition will differ with the degree of impact properties desired. The degree of neutralization effective in imparting improved impact properties to the modified block copolymer/polyester blend ranges from about 0 to about 100 percent of the carboxyl groups in the modified block copolymer. Within this range, blends considered to be "super-tough" may be attained. A blend is considered to be "super-tough" herein when its $\frac{1}{8}''$ Notched Izod at room temperature in excess of 10 ft-lb/in and the blend experiences ductile failure, as opposed to brittle failure.

The improvement in toughness of the compositions herein is related to the amount of adherent sites in the modified block copolymer component and the degree of block copolymer distribution. Phase size is utilized as a measurement of the degree of block copolymer distribution. Phase size is either the cross-sectional area of a section (cell) of a continuous phase or the diameter of a discrete particle.

The mechanism of adhesion and the role of the copolymer/polyester interface to promote block copolymer phase size reduction is not entirely understood. However, it appears that the strong interaction or potential grafting reaction between same and block copolymer phase size are interrelated. To some extent, enhancing the extent of interaction or reaction appears to facilitate a reduction in block copolymer phase size. Moreover, it appears that by increasing the block copolymer/polyester interface more sites are made available for the unknown mechanism herein to operate upon. However, whether the block copolymer may be continuous, partially continuous, or dispersed within the polyester, optimum toughening of the respective polyester is surprisingly not achieved at the smallest attainable phase size. Below a certain phase size, super-toughened polyester blend properties are not attained. For example, when the minimum amount of carboxyl functional groups required for super-toughening are present, super-toughened PBT blends are obtained when the modified block copolymer phase size is from about 0.4 $\mu$m to about 0.7 $\mu$m. The phase size required for super-toughened PET blends is from about 0.2 $\mu$m to about 0.5 $\mu$m.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

The compositions of the present invention can be readily molded or formed into various kinds of useful articles by using any conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, packaging materials, building materials and the like.

To assist those skilled in the art in the practice of this invention, the following Examples are set forth as illustrations. It is to be understood that in the specification and claims herein, unless otherwise indicated, when the amount of the polyester or block copolymer is expressed in terms of percent by weight, it is meant percent by weight based on the total amount of these materials which is employed in the melt-blending. Furthermore, it is to be understood that, unless otherwise indicated, when the amount of carboxylic acid (—COOH) or carboxylate ion (—COO⁻) is expressed in terms of percent by weight (% w), it is meant percent by weight based on the corresponding base block copolymer. It is to be further understood that the carboxylate salt to carboxylic acid ratio (salt to acid ratio) is equal to (the numerical value of % neutralization): (100 minus the numerical value of % neutralization). In these Examples, injection molded bars of these compositions were tested using the following test procedures in the dry-as-molded state:

Notched Izod toughness: at each end ASTM D-256

Flexural Modulus: ASTM D-790 Properties represent an average of at least five test specimens.

EXAMPLES OF THE INVENTION

Having thus broadly described the present invention, it is believed that the same will become even more apparent by reference to the following examples. It will be appreciated, however, that the examples are presented solely for the purposes of illustration and should not be construed as limiting the invention.

The base (unmodified hydrogenated) block copolymers used were the polystyrene-poly(ethylene/propylene) (S-EP) and polystyrene-poly(ethylene/butylene)-polystyrene (S-EB-S) block copolymers shown in Table 1. The base block copolymers were the products of selectively hydrogenating polystyrene-polyisoprene (S-I) or polystyrene-polybutadiene-polystyrene (S-B-S) block copolymers (precursor block copolymers) effected by use of a catalyst comprising the reaction products of an aluminum alkyl compound with nickel carboxylates. The base block copolymers have a residual ethylenic unsaturation of less than about 2% of the original unsaturation in the poly(conjugated diene) block and have a residual aromatic unsaturation of greater than 95% of the original unsaturation in the polystyrene block.

TABLE 1

| Base Block Copolymer | Styrene Content (wt. %) | Block Styrene Content (wt. %) | Total Mw. | Polymer Structure and Block Mw |
|---|---|---|---|---|
| A | 29 | 29 | 66,000 | 9,600-46,800-9,600 (S—EB—S) |
| B | 32 | 32 | 181,000 | 29,000-123,000-29,000 (S—EB—S) |
| C | 29 | 29 | 49,700 | 7,200-35,300-7,200 (S—EB—S) |
| D | 30 | 30 | 51,500 | 7,700-36,100-7,700 (S—EB—S) |
| E | 28 | 28 | 159,000 | 44,600-114,400 (S—EP) |
| F | 38 | 38 | 98,100 | 37,200-60,900 (S—EP) |

Remarks:
S - Polymer block composed chiefly of styrene.
EB - Polymer block composed chiefly of hydrogenated polybutadiene and referred to as ethylene/butylene.
EP - Polymer block composed chiefly of hydrogenated polyisoprene and referred to as ethylene/propylene.
Mw - Weight average molecular weight.

Per the following examples, the base block copolymer was first modified to varying degrees of carboxyl group functionality (content) by grafting carboxyl groups onto the polystyrene blocks via the metalation process described herein. The modified block copolymers were then further modified with lithium, sodium and zinc metals to form carboxylate salts at various acid to carboxylate salt contents (degree of neutralization).

EXAMPLE 1

Modified Block Copolymer (Method I)

In this experiment, a modified block copolymer "G" was prepared utilizing the base block copolymer "A". 2270 gm of polymer "A" were dissolved in 15 gallons of cyclohexane. This mixture was placed in a 20 gallon stainless steel pressurized reaction vessel and pressurized to about 25 psig with nitrogen. 0.8 meq/gm polymer of N,N,N',N'-tetramethylethylene diamine was then added to the vessel. A small amount, 0.5 ml, of 1,1-diphenylethylene (an indicator) was then added to the reactor. Sec-butyllithium was then added incrementally until a yellow color was obtained, indicating the absence of impurities.

The reactor contents were then heated to 60° C. Next, 0.4 meq/gm polymer of additional sec-butyllithium was added to the reactor. After 2½ hours reaction time, the contents of the vessel were transferred to another vessel which contained a stirring mechanism. The second vessel contained 2-3 lbs of dry ice (solid $CO_2$), 10 gallons of tetrahydrofuran, and 5 gallons of diethylether. The solution was stirred for 30 minutes. Next, 85 grams of acetic acid in an isopropanol solution was added to the reactor. This solution was stirred for 16 hours. The modified block copolymer was then recovered by steam stripping.

Infrared analysis of the polymer showed the presence of both bound carboxylic acid at 1690 $cm^{-1}$ and bound lithium carboxylate salt at 1560-1600 $cm^{-1}$. By colorimetric titration with 0.01N KOH in methanol using a phenothalein indicator, it was found that the level of bound acid was 0.3 wt % COOH. After repeated washings of the polymer with alcoholic hydrochloric acid (reacidification), infrared showed that complete conversion of salt to acid took place. Alternatively, the polymer may be redissolved in THF or cyclohexane and then adding an excess of acetic acid (reacidification) to convert the salt to carboxylic acid groups. Thereafter, the polymer may be coagulated in an alcohol, for example, isopropanol, butanol, and methanol. Titration of the washed polymer gave a bound acid level of 0.4% w COOH. Thus, the carboxyl functionality of Polymer "G" is 0.4% w. Prior to reacidification, the polymer contained 0.3% w —COOH and 0.1% —COOLi (lithium carboxylate salt).

Polymers H, J, K and L (see Table 2) were prepared using a modification of the procedure described for the preparation of Polymer G. Polymer H used Polymer B as a starting material. Polymers J, K and L used Polymer C as a starting material. Polymer J was recovered by precipitation in isopropyl alcohol, as opposed to steam coagulation like the other polymers herein. These preparations respectively employed a decreased or increased amount of the metalation reagent (promoter) relative to the amount of polymer substrate to achieve the carboxylate contents shown in Table 2.

EXAMPLE 2

Modified Block Copolymer (Method II, Preferred)

In this experiment, a modified block copolymer "N" was prepared utilizing the base block copolymer "D".

A 5% (wt/wt) solution of Polymer D (see Table 1) in cyclohexane (3100 lb) was treated, in a closed vessel under nitrogen, with the metalation promoter, N,N,N',N'-tetramethylethylenediamine (TMEDA) (14 lb, 55 mol) and a titration indicator, 1,1-diphenylethylene (21 g, 0.1 mol). This solution was heated with stirring to 50° C. and titrated with s-butyllithium solution to remove impurities. At the endpoint of the titration, a slight excess of s-butyllithium reagent was reacted with the indicator forming a benzylic anion which gave the solution a yellow/orange color; the persistence of this color was taken as an indication that the solution was now anhydrous and anaerobic. These conditions were maintained throughout the rest of the experiment.

The metalation reagent, s-butyllithium (41 lb of a 12% (wt/wt) solution in cyclohexane, 35 mol), was added to the reaction mixture over a period of 15 minutes. The lithiated polymer cement was quite viscous and yellow in color. An aliquot of the cement was removed and treated with an excess of $D_2O$. This procedure placed a deuterium atom on the polymer at sites which had been lithiated. Analysis of the deuterated polymer using a Deuterium NMR technique found 89% of the deuterium was attached to the aromatic ring. Appropriate control experiments showed that the remainder of the deuterium label was at benzylic centers (about 5%) in the polystyrene segment and at allylic centers (about 6%) in the rubber of the polymer. These results showed that the polymer was lithiated principally in the styrene blocks (at least 94%).

After 1 hour in the lithiation reactor (60° C.), the cement was transferred to a closed vessel containing carbonated (142 lb of $CO_2$, 1500 mol) tetrahydrofuran (THF) (about 380 gal). The lithiated polymer cement was introduced below the surface of the $CO_2$/THF mixture. While carboxylation was likely instantaneous, the mixture was stirred at room temperature for 4 hr. The reactor product was acidified by the addition of 26 lbs. of acetic acid (200 mol). Modified block copolymer N was recovered by steam coagulation and dried at 50°-60° C. in a vacuum oven.

To measure the polymer bound carboxylic acid (—COOH) content of Polymer N, an aliquot of the finished polymer was dissolved in THF and titrated to a phenolphthalein endpoint using 0.01N KOH in methanol. The titration found 1.15% wt —COOH.

To determine the total carboxylate content, both —COO$^-$ and —COOH moieties of Polymer N, an aliquot of the finished polymer was dissolved in cyclohexane at a 10% solids level and treated with an equal volume of acetic acid. Control experiments had shown that the acid treatment converted polymer bound —COO$^-$ to —COOH species. The acidified mixture was repeatedly washed with $H_2O$ until the wash sample was neutral to remove excess acetic acid and acetate salts. The fully acidified polymer was precipitated in isopropanol, dried and titrated as outlined above. The titration found 1.15% wt —COOH; the same result as had been observed for the as finished polymer. By difference, we concluded that the as finished product, Polymer N, contained no carboxylate salt; Polymer N was in the all acid form —COOH.

An infrared analysis based upon characteristic IR bands for the —COOH species (1690 cm$^{-1}$) and polystyrene (1590 cm$^{-1}$) (in essence an internal standard signal) corroborated the titration results. The IR data were from a solution cast film of Polymer N.

Polymers M, P, Q, R, S, and T (see Table 2) were prepared using a modification of the procedure described for the preparation of Polymer N. Polymers M, P, Q, R, S, and T were prepared on a 5 lb scale. Polymer M and P used Polymer D as a starting material. Polymers Q, R and S used Polymer E as a starting material. Polymer T used Polymer F as a starting material. These preparations respectively employed a decreased and an increased amount of the metalation reagent (promoter) relative to the amount of polymer substrate. This led to products having lower and higher carboxylate contents, respectively.

TABLE 2

| Modified Block Copolymer | Base Block Copolymer | Carboxyl Functionality (% w-COOH) | Ratio of Carboxyl Groups to Alkenyl Arene Units in Base Block Copolymer | Carboxyl Groups per Molecule of Block Copolymer |
|---|---|---|---|---|
| G | A | 0.40 | 1:33.4 | 5.9 |
| H | B | 0.33 | 1:43.7 | 13.3 |
| J | C | 0.22 | 1:59.3 | 2.4 |
| K | C | 1.18 | 1:11.1 | 13.0 |
| L | C | 1.39 | 1:9.4 | 15.4 |
| M | D | 1.00 | 1:13.5 | 11.4 |
| N | D | 1.15 | 1:11.6 | 13.2 |
| P | D | 1.40 | 1:9.6 | 16.0 |
| Q | E | 0.1 | 1:126 | 3.5 |
| R | E | 0.5 | 1:24.2 | 17.7 |
| S | E | 1.3 | 1:9.7 | 45.9 |
| T | F | 2.6 | 1:6.6 | 56.7 |

EXAMPLE 3

Neutralized Modified Block Copolymers

In this example, modified block copolymers were neutralized utilizing monovalent metal counterions, such as sodium ($Na^{1+}$) and lithium ($Li^{1+}$), and divalent metal counterions, such as zinc ($Zn^{2+}$). The modified block copolymers were obtained by adding aqueous sodium hydroxide, lithium hydroxide and zinc acetate solutions in THF, respectively, to the modified block copolymer (all acid). The modified block copolymers neutralized utilizing magnesium metal counterions may be obtained by neutralizing the respective modified block copolymer (all acid) with magnesium methoxide in anhydrous methanol. For those neutralized modified block copolymers having a metal carboxylate salt content greater than 80% based on total carboxyl groups, an excess of the metal carrying compound was utilized (typically five times stoichiometric) to ensure the high degree of neutralization.

Table 3 indicates the various neutralized block copolymers produced from the corresponding modified block copolymers for purposes of the following examples.

TABLE 3

| Modified Block Copolymer | Carboxyl Functionality (% w) | Metal Counter-ion | % Carboxyl Groups Neutralized | % w Acid | % w Salt |
|---|---|---|---|---|---|
| G | 0.40 | — | 0 | 0.40 | — |
| U1 | 0.40 | Li | 25 | 0.30 | 0.10 |
| U2 | 0.40 | Li | 100 | — | 0.40 |
| H | 0.22 | — | 0 | 0.22 | — |
| V1 | 0.22 | Li | 55 | 0.10 | 0.12 |
| V2 | 0.22 | Li | 100 | — | 0.22 |
| J | 0.33 | — | 0 | 0.33 | — |
| W1 | 0.33 | Li | 33 | 0.22 | 0.11 |
| K | 1.18 | — | 0 | 1.18 | — |
| X1 | 1.18 | Li | 49 | 0.60 | 0.58 |
| L | 1.39 | — | 0 | 1.39 | — |
| Y1 | 1.39 | Li | 19 | 1.12 | 0.27 |
| Y2 | 1.39 | Li | 100 | — | 1.39 |
| M | 1.00 | — | 0 | 1.00 | — |
| Z1 | 1.00 | Li | 30 | 0.70 | 0.30 |
| Z2 | 1.00 | Li | 80 | 0.20 | 0.80 |
| AA1 | 1.00 | Zn | 50 | 0.50 | 0.50 |
| N | 1.15 | — | 0 | 1.15 | — |
| BB1 | 1.15 | Li | 50 | 0.58 | 0.57 |
| BB2 | 1.15 | Li | 66 | 0.39 | 0.76 |
| CC1 | 1.15 | Na | 55 | 0.52 | 0.63 |
| P | 1.40 | — | 0 | 1.40 | — |
| DD1 | 1.40 | Li | 46 | 0.76 | 0.64 |
| Q | 0.1 | — | 0 | 0.10 | — |
| EE1 | 0.1 | Li | 60 | 0.04 | 0.06 |
| S | 1.3 | — | 0 | 1.3 | — |
| FF1 | 1.3 | Li | 8 | 1.20 | 0.10 |
| T | 2.6 | — | 0 | 2.6 | — |
| GG1 | 2.6 | Li | 52 | 1.25 | 1.35 |

EXAMPLE 4

Effect of Rubber Content on Blend Impact Properties

In this example, the impact strengths and flexural modulus of molded test pieces of various polyester blend compositions were measured. The thermoplastic polyester used in this example was a commercial PBT, Valox ® 310, a molding grade polyester obtained from General Electric. Prior to all processing steps, the PBT and its blends were dried at 60° C. for four (4) hours under vacuum with a nitrogen purge.

Blends of PBT with both unmodified and modified block copolymer were prepared in a 30 mm diameter corotating twin screw extruder. The blend components were premixed by tumbling in polyethylene bags, and then fed into the extruder. The extruder melt temperature profile was about 230° C. in the feed zone, about 240° C. in the barrel, and about 240° C. at the die. A screw speed of 300 rpm was used. The extrudate was pelletized. Injection molded test specimens were made from pelletized extrudate using an Arburg injection molder (Model number 221-55-250). Injection temperatures and pressures of about 220° C. to about 240° C. and about 800 psig to about 1200 psig, respectively, were employed during the processing operations. The formulations and physical properties are shown in Table 4. Therein, samples "01" through "07" are controls.

As is readily apparent from Table 4, the addition of the modified block copolymers (U1 and DD1) significantly increases the impact strength of the polyester PBT. Additionally, improvements in the impact toughness of the modified block copolymer/polyester blends are surprisingly achieved without significantly sacrificing or compromising its flexural modulus (05, 06 and 07 versus 12, 14 and 16). Furthermore, the addition of at least about 15 percent by weight of the modified block copolymer produces a super-tough polyester blend material. A material is defined to be "super-tough" when the room temperature impact strength determined using ASTM-256 exceeds 10 ft-lb/in and a ductile failure is observed (test specimen does not break). As is readily apparent from FIG. 1, a distinct brittle to ductile failure transition is observed between 10 and 15 percent by weight of the modified block copolymer in the blend composition (Curve I of FIG. 1), whereas no such transition occurs in the blend containing the unmodified block copolymer (Curve II of FIG. 1).

TABLE 4

| | Composition (% w) | | | | ⅛" Dry as Molded Notched Izod (ft-lb/in) | | | Flexural Modulus |
|---|---|---|---|---|---|---|---|---|
| | | Unmodified Block Copolymer | | Modified Block Copolymer | | | | |
| Sample | PBT | A | C | U1 | DD1 | R.T. | −20° F. | −40° F. | (Kpsi) |
| 01 | 100 | — | — | — | — | 0.9 | 0.8 | 0.7 | 335 |
| 02 | 90 | 10 | — | — | — | 0.9 | — | — | — |
| 03 | 80 | 20 | — | — | — | 1.4 | — | — | — |
| 04 | 70 | 30 | — | — | — | 1.7 | — | — | — |
| 05 | 90 | — | 10 | — | — | 1.6 | 0.9 | 0.8 | 305 |
| 06 | 80 | — | 20 | — | — | 2.2 | 1.2 | 1.2 | 280 |
| 07 | 70 | — | 30 | — | — | 2.9 | 1.3 | 1.2 | 230 |
| 08 | 90 | — | — | 10 | — | 2.0 | — | — | — |
| 09 | 80 | — | — | 20 | — | >19.9[a] | — | — | — |
| 10 | 70 | — | — | 30 | — | >21.5[a] | — | — | — |
| 11 | 95 | — | — | — | 5 | 1.1 | 0.9 | — | 312 |
| 12 | 90 | — | — | — | 10 | 2.0 | 1.1 | — | 279 |
| 13 | 85 | — | — | — | 15 | >13.0[a] | 1.9 | — | 240 |
| 14 | 80 | — | — | — | 20 | >18.0[a] | 2.6 | — | 220 |
| 15 | 75 | — | — | — | 25 | >19.8[a] | 3.3 | — | 199 |
| 16 | 70 | — | — | — | 30 | >19.9[a] | 4.1 | — | 176 |

[a]Ductile failure.

EXAMPLE 5

Effect of Counterion on Blend Properties

As in Example 4, the impact strengths and flexural modulus of similarly prepared molded test pieces of various polyester blend compositions were measured. PBT (Valox ® 310 from General Electric) and PET (Cleartuf ® 7207CS from Goodyear Chemical) were utilized as the polyesters. The compositions had a fixed block copolymer to polyester ratios of 20:80 and 30:70. The samples prepared utilized the respective polyester (controls), the base block copolymers "C" and "D" (controls) and the modified block copolymer with carboxyl functionality (content) of between 1.0% to 1.18% w having the counterions $H^{1+}$ (N), $Li^{1+}$ (X1, Z1, Z2 and BB1), $Na^{1+}$ (CC1) and $Zn^{2+}$ (AA1).

Table 5 depicts the effect of different counterions on the impact strength as a function of temperature and on the flexural modulus of the respective materials. The monovalent metal (Li and Na) containing carboxylate salts appeared to outperform the divalent metal (Zn) containing carboxylate salt in the blend compositions (18, 20, 21, 22, and 23 versus 19.) Furthermore, it appears that super-tough properties are detrimentally affected by metal ions having an available positive valence state greater than one (1), at least in PET blends. The unmodified block copolymer and the zinc carboxylate salt version of the modified block copolymer were comparable in modifying the impact performance of the polyester (19 versus 06, 07 and 25). Here the opportunity presents itself wherein the blend composition may be tailored to specific impact modification requirements by utilizing a specific metal counterion and/or combination of metal counterions with or without the acid form of the modified block copolymer.

TABLE 5

| Composition (% w) | | | 17 | 18 | 19 | 20 | 21 | 22 | Sample 23 | 01 | 24 | 06 | 07 | 25 |
|---|---|---|---|---|---|---|---|---|---|---|---|---|---|---|
| Polyester: | | | | | | | | | | | | | | |
| PBT | | | 80 | 80 | 80 | 70 | 70 | 80 | 80 | 100 | 100 | 80 | 70 | 70 |
| PET | | | | | | | | | | | | | | |
| Block Copolymer | Functionally (% w) | % Neutralization | | | | | | | | | | | | |
| N | 1.15 | 0 | 20 | | | | | | | | | | | |
| BB1 | 1.15 | 50 | | 20 | | | | | | | | | | |
| AA1 | 1.0 | 50 | | | 20 | | | | | | | | | |
| CC1 | 1.15 | 55 | | | | 30 | | | | | | | | |
| X1 | 1.18 | 49 | | | | | 30 | | | | | | | |
| Z1 | 1.0 | 30 | | | | | | 20 | | | | | | |
| Z2 | 1.0 | 80 | | | | | | | 20 | | | | | |
| C | — | — | | | | | | | | | | 20 | | |
| D | — | — | | | | | | | | | | | 30 | 30 |
| Metal Counterion | | | — | Li | Zn | Na | Li | Li | Li | — | — | — | — | — |
| Flexural Modulus (Kpsi) | | | 208 | 246 | 210 | — | 175 | 242 | 216 | 335 | 406 | 280 | 230 | 241 |
| ⅛″ Dry as Molded Notched Izod (ft-lb/in) | | | | | | | | | | | | | | |
| Room Temperature | | | >21.1[a] | >18.2[a] | 1.6 | >20.2[a] | >21.1[a] | >21.3[a] | >15.9[a] | 0.9 | 0.5 | 2.2 | 2.9 | 1.2 |
| −20° F. | | | — | 1.1 | 0.6 | — | 5.0 | 1.0 | — | 0.8 | — | 1.2 | 1.3 | — |
| −40° F. | | | — | 1.0 | 0.6 | — | 3.2 | 1.9 | — | 0.7 | — | 1.2 | 1.2 | — |

[a]Ductile Failure

EXAMPLE 6

Effect of Degree of Neutralization on Blend Properties

In this example, the impact strengths and flexural moduli of molded test specimens of various polyester blend compositions were measured. Herein, the degree of neutralization (metal carboxylate salt content) was varied to measure the corresponding effect on these properties at polyester to block copolymer ratios of 80:20 and 70:30. Furthermore, the measurements were performed on two different polyesters, PBT (Valox® 310) and PET (Cleartuf® 7207CS). Specimens utilizing only PBT (01), PET (24), a 70:30 and 80:20 ratio of PBT to unmodified block copolymer (04 and 07, 30 and 06), and a 70:30 ratio of PET to unmodified block copolymer (25) were prepared as controls.

As is readily apparent from Tables 6, 7 and 8, the effect of the degree of neutralization of the modified block copolymer on the impact properties of the respective polyester blend is substantial.

Furthermore, with respect to super-tough properties, the effect of the degree of neutralization of the modified block copolymer is unexpectedly unique as between PBT and PET, both of which are poly(alkylene terephthalates).

POLY(BUTYLENE TEREPHTHALATE) (PBT)

Figure 2:
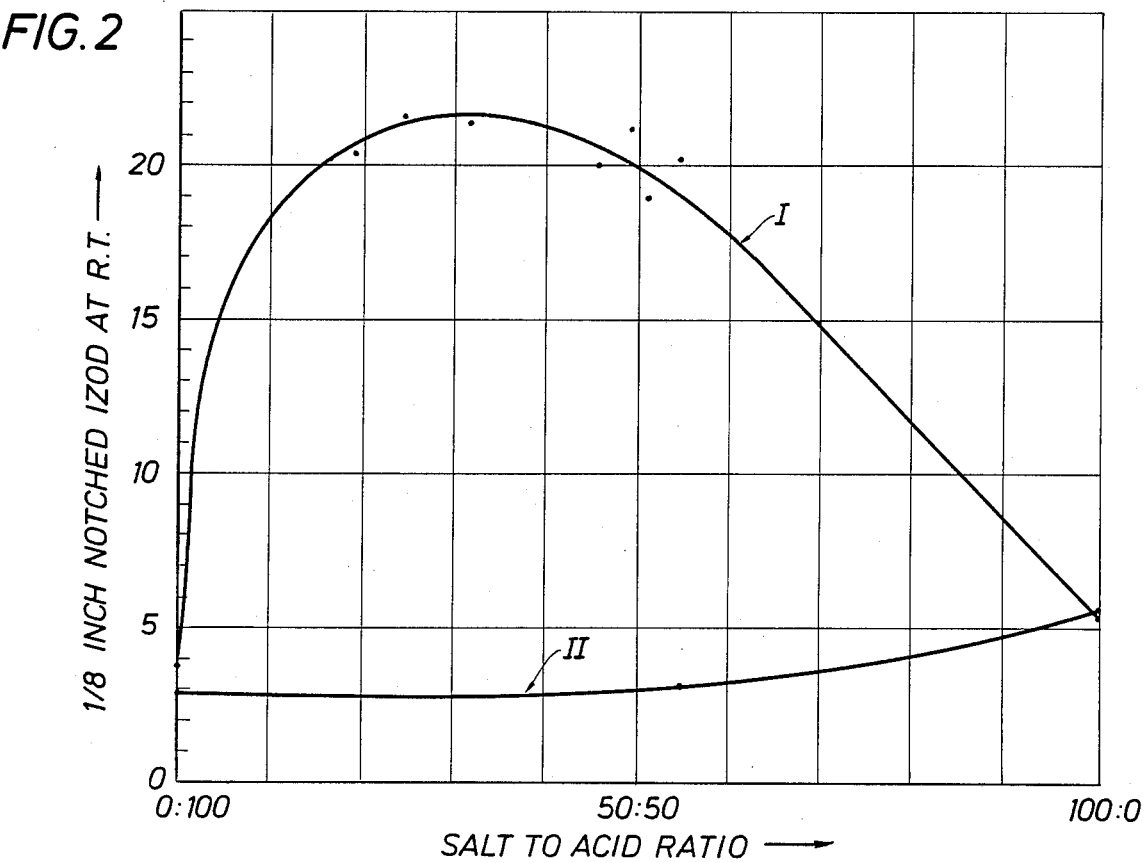
FIG. 2 is an x-y plot of ⅛ inch notched izod at room temperature (ft. lb./in.) versus the ratio of carboxylate salt to carboxylic acid for PBT blends (30% w block copolymer).

As depicted in FIG. 2 (curve I) and tabulated in Table 6, 70:30 PBT/modified block copolymer blend compositions of the present invention experience two brittle to ductile failure transitions. The first transition is observed between 0% and 20% (2.5% which is about 5%) neutralization (i.e., metal carboxylate salt concentration with respect to total carboxyl group functionality in the respective modified block copolymer which is incorporated in the respective PBT blend). The second transition is observed between 55% and 100% (about 85%) neutralization. Thus, for super-toughening a 70:30 PBT/modified block copolymer blend, the effective degree of neutralization ranges from about 5% to about 85%.

Figure 3:
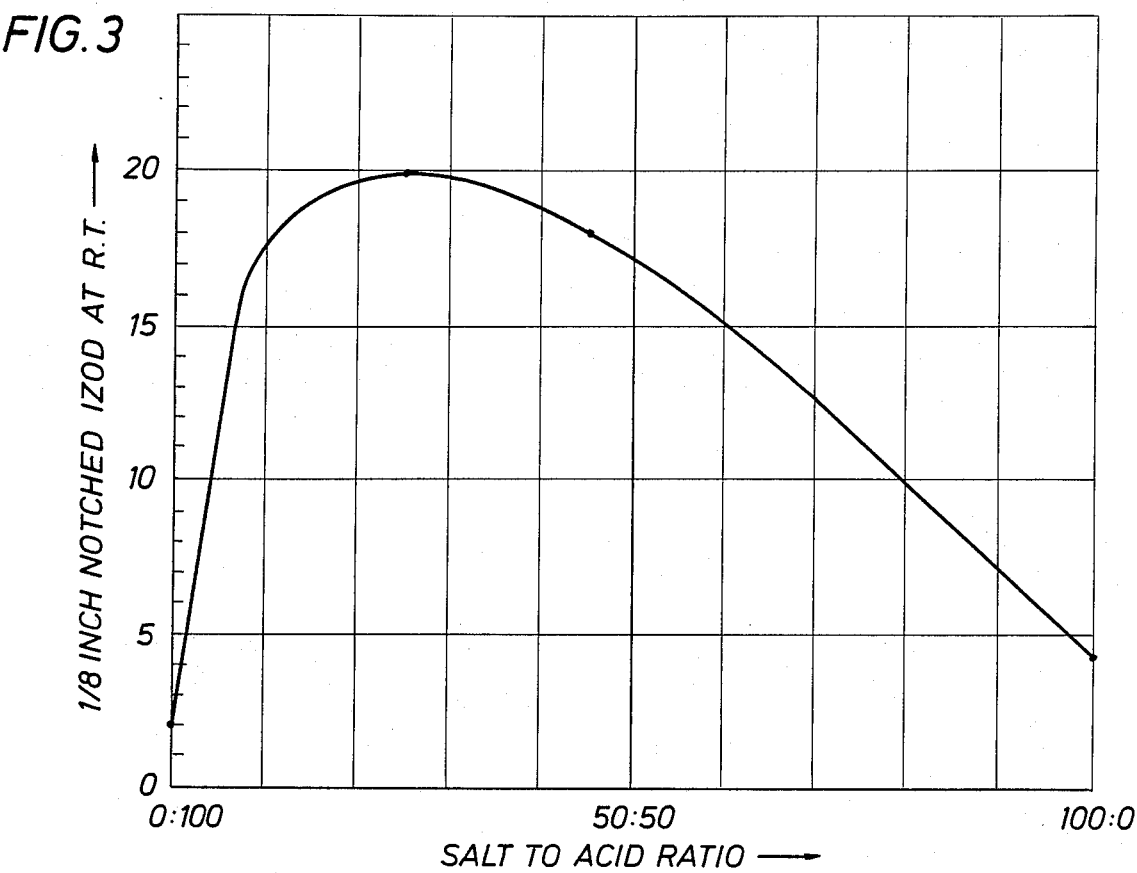
FIG. 3 is an x-y plot of ⅛ inch notched izod at room temperature (ft. lb./in.) versus the ratio of carboxylate salt to carboxylic acid for PBT blends (20% w block copolymer).

As depicted in FIG. 3 and tabulated in Table 7, 80:20 PBT/modified block copolymer blend compositions of the present invention also experience two brittle to ductile failure transitions. The first transition is observed between 0% and 20% (3.0% which is about 5%) neutralization. The second transition is observed between 55% and 100% (about 80%) neutralization. Thus, for super-toughening a 80:20 PBT/modified block copolymer blend, the effective degree of neutralization ranges from about 5% to about 80%.

Figure 4:
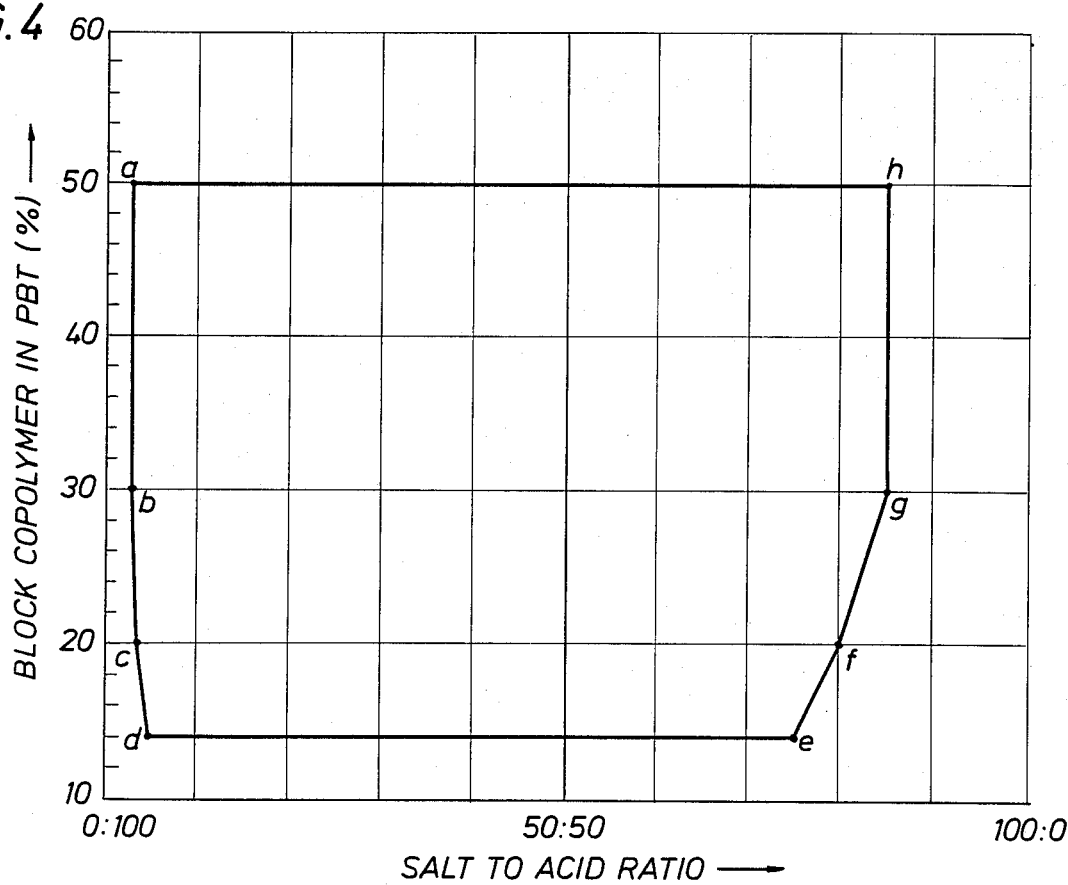
FIG. 4 is an x-y plot of block copolymer content (% w) versus the ratio of carboxylate salt to carboxylic acid for PBT blends.

Now referring to curve I on FIG. 1, a brittle to ductile failure transition, dependent primarily on the block copolymer content of the PBT blend, is indicated at 14% w (about 15% w) modified block copolymer content. Therein, the respective modified block copolymers were neutralized to 25% and 46%, respectively. With the above-referenced information tabulated in Table 8, FIG. 4 was constructed. FIG. 4 indicates that at the minimum block copolymer content required for super-toughening PBT the effective degree of neutralization ranges from about 5% to about 75%.

POLY(ETHYLENE TEREPHTHALATE) (PET)

Figure 5:
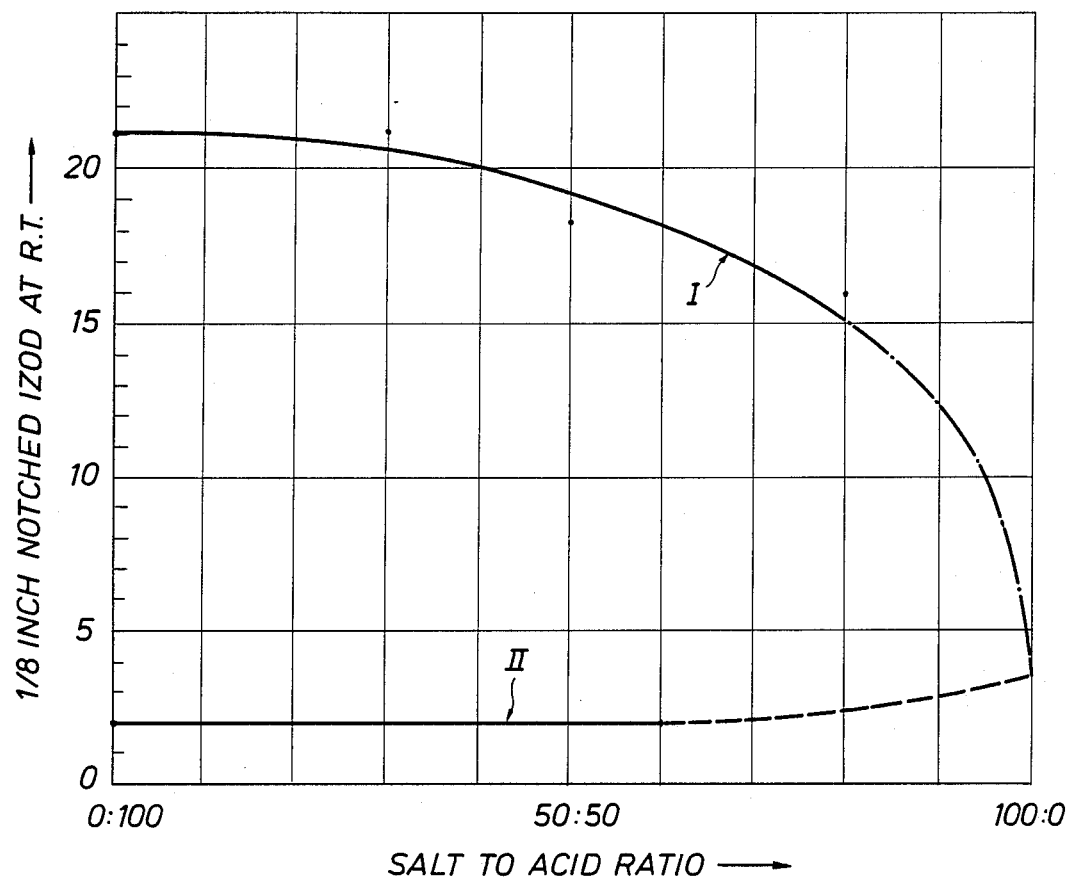
FIG. 5 is an x-y plot of ⅛ inch notched izod at room temperature (ft.-lb./in.) versus the ratio of carboxylate salt to carboxylic acid for PET blends (20% w block copolymer).

On the other hand, as depicted in FIG. 5 and tabulated in Table 9, PET blend compositions of the present invention apparently may only experience one brittle to ductile failure transition. This transition is believed to occur between 80% and 100% neutralization, probably about 95% neutralization. (See curve I of FIG. 5). Thus, the effective degree of neutralization for super-toughening PET is at most about 95%, preferably from about 0% to about 90%, and more preferably from about 0% to about 80%.

POLYESTERS IN GENERAL

Be that as it may, an improvement of the impact properties of articles manufactured from the polyester blends of the present invention is achieved over those impact properties achieved when utilizing the respective polyester alone or in a blend with the respective unmodified (base) block copolymer. Such improvement is achieved over the entire range of neutralization (i.e., from 0% to 100%), regardless of the metal ion utilized in neutralizing the carboxyl groups grafted thereto.

However, the optimum level of impact modification (i.e., super-tough materials) is experienced when the ductile failure mechanism is present. As the data herein indicates, the neutralization range needed to induce the change in the mode of failure from brittle to ductile is quite distinct. Thus, precise determination of this transition is easily and readily determinable for modified block copolymers containing more or less carboxyl group functionality, different polyesters, different polyesters to block copolymer ratios and different metal counterions by performing the ASTM-256 - ⅛" notched izod impact test on specimens prepared from these various compositions. As such, the impact modification of polyesters utilizing these modified block copolymers may be controlled through the neutralization process prior to or during blending operations.

TABLE 6

| Sample[c] | Block Copolymer | Functionality (% w) | Neutralization (%) | Metal Counterion | Flexural Modulus (Kpsi) | ⅛" Dry as Molded Notched Izod Impact Toughness (ft-lb/in) RT[b] | −20° F. | −40° F. |
|---|---|---|---|---|---|---|---|---|
| 01 | — | — | — | — | 335 | 0.9 | 0.8 | 0.7 |
| 04 | A | — | — | — | — | 1.7 | — | — |
| 07 | C | — | — | — | 230 | 2.9 | 1.3 | 1.2 |
| 26 | L | 1.39 | 0 | — | 174 | 3.8 | 1.0 | 0.8 |
| 27 | Y1 | 1.39 | 19 | Li | 190 | >20.4[a] | 3.2 | 2.4 |
| 10 | U1 | 0.40 | 25 | Li | — | >21.5[a] | — | — |
| 28 | W1 | 0.33 | 33 | Li | 190 | >21.3[a] | 2.0 | 1.6 |
| 16 | DD1 | 1.40 | 46 | Li | 176 | >19.9[a] | 4.1 | — |
| 21 | X1 | 1.18 | 49 | Li | 175 | >21.1[a] | 5.0 | 3.2 |
| 20 | CC1 | 1.15 | 55 | Na | — | >20.2[a] | — | — |

TABLE 6-continued

| Sample[c] | Block Copolymer | Functionality (% w) | Neutralization (%) | Metal Counterion | Flexural Modulus (Kpsi) | ⅛″ Dry as Molded Notched Izod Impact Toughness (ft-lb/in) | | |
|---|---|---|---|---|---|---|---|---|
| | | | | | | RT[b] | −20° F. | −40° F. |
| 29 | Y2 | 1.39 | 100 | Li | 204 | 5.4 | 1.7 | 1.4 |

[a]Ductile failure.
[b]Room Temperature.
[c]This data was utilized in constructing curve I in FIG. 2. "01", "04", and "07" are controls. Except for "01", all samples were formulated as 70% PBT and 30% block copolymer.

TABLE 7

| Sample[c] | Block Copolymer | Functionality (% w) | Neutralization (%) | Metal Counterion | Flexural Modulus (Kpsi) | ⅛″ Dry as Molded Notched Izod Impact Toughness (ft-lb/in) | | |
|---|---|---|---|---|---|---|---|---|
| | | | | | | RT[b] | −20° F. | −40° F. |
| 01 | — | — | — | — | 335 | 0.9 | 0.8 | 0.7 |
| 30 | A | — | — | — | — | 1.4 | — | — |
| 06 | C | — | — | — | 280 | 2.2 | 1.2 | 1.2 |
| 31 | G | 0.40 | 0 | — | — | 2.0 | — | — |
| 09 | U1 | 0.40 | 25 | Li | — | >19.9[a] | — | — |
| 14 | DD1 | 1.40 | 46 | Li | 220 | >18.0[a] | 2.6 | — |
| 32 | U2 | 0.40 | 100 | Li | — | 4.3 | — | — |

[a]Ductile failure.
[b]Room Temperature.
[c]This data was utilized in constructing FIG. 3. "01", "30", and "06" are controls. Except for "01", all samples were formulated as 80% PBT and 20% block copolymer.

TABLE 8

| Sample[a] | Block Copolymer (% w) | Neutralization (%) | ⅛″ Dry as Molded Notched Izod Impact Toughness (ft-lb/in) | | |
|---|---|---|---|---|---|
| | | | RT | −20° F. | −40° F. |
| 33 | 30[a] | 2.5 | 10.0 | — | — |
| 34 | 20[b] | 3.0 | 10.0 | — | — |
| 35 | 14[c] | 35 | 10.0 | — | — |
| 36 | 14[c] | 46 | 10.0 | — | — |
| 37 | 20[b] | 80 | 10.0 | — | — |
| 38 | 30[a] | 85 | 10.0 | — | — |

[a]Data obtained from FIG. 2.
[b]Data obtained from FIG. 3.
[c]Data obtained from FIG. 1.

TABLE 9

| Sample[c] | Block Copolymer | Functionality (% w) | Neutralization (%) | Metal Counterion | Flexural Modulus (Kpsi) | ⅛″ Dry as Molded Notched Izod Impact Toughness (ft-lb/in) | | |
|---|---|---|---|---|---|---|---|---|
| | | | | | | RT[b] | −20° F. | −40° F. |
| 24 | — | — | — | — | 406 | 0.5 | — | — |
| 25 | D[d] | — | — | — | 241 | 1.2 | — | — |
| 17 | N | 1.15 | 0 | — | 208 | >21.1[a] | — | — |
| 22 | Z1 | 1.0 | 30 | Li | 242 | >21.3[a] | 1.0 | 1.0 |
| 18 | BB1 | 1.15 | 50 | Li | 246 | >18.2[a] | 1.1 | 1.0 |
| 23 | Z2 | 1.0 | 80 | Li | 216 | >15.9[a] | — | — |
| 39 | Z1[d] | 1.0 | 30 | Li | 242 | >21.0[a] | 1.5 | 1.1 |

[a]Ductile failure.
[b]Room Temperature.
[c]This data was utilized in constructing Curve I of FIG. 5. "24" and "25" are controls. Except for "24", "25" and "39", all samples were formulated as 80% PET and 30% block copolymer.
[d]"25" and "39" were formulated as 70% PET and 30% block copolymer and are presented herein for comparative purposes.

EXAMPLE 7

Effect of Degree of Functionality on Blend Properties

In this example, the impact strength of molded test specimens of various polyester blend compositions were measured. Herein, at a fixed polyester to block copolymer ratio (a ratio of 80:20 for PET and a ratio of 70:30 for PBT) and at approximately equal neutralization levels utilizing lithium as the metal counterion, the degree of functionality (carboxyl group content) was varied to measure the corresponding effect on the impact strength of the respective compositions. Specimens utilizing PBT (01) and, PET (24), a 70:30 ratio of PBT to unmodified block copolymer (07) and a 70:30 ratio of PET to unmodified block copolymer (25) were prepared as controls.

As is evident from Table 10 and FIGS. 2 and 5, increasing the degree of carboxyl functionality in the modified block copolymer results in a dramatic improvement in the impact strength of the polyester blend composition. A transition from a brittle to ductile failure mechanism is also observed. As is quite apparent from Tables 10 and 11 for PBT and PET blends of the present invention, respectively, the minimum degree of functionalization effective for super-toughening these PET and PBT blends is at least 0.25% w carboxyl functional groups based on the base block copolymer. However, a general improvement in the impact properties of such blends, say over the respective polyester alone, is achieved with functionality levels as low as 0.1% w, and believed as low as 0.02% w, carboxyl functional groups based on the base block copolymer. Thus, for this general improvement, it is believed that the effective level of functionality ranges from at least 0.02% w, preferably from about 0.02% w to about 20% w, preferably 0.1% w to about 10% w, and more preferably from about 0.2% w to about 5% w, of the grafted carboxyl functional groups based on the base block copolymer.

Thus, the foregoing indicates that a minimum amount of grafting and/or strong interaction is required to obtain the desired phase size which translates in part into improved impact properties. Therefore, the degree of functionality of the modified block copolymer provides another means by which impact modification of polyesters may be controlled.

Blends of the respective polyesters with both unmodified and modified block copolymer were prepared in a 30 mm diameter corotating twin screw extruder. The blend components were premixed by tumbling in polyethylene bags and then fed into the extruder.

For PET blends, the extruder melt temperature profile was about 235° C. in the feed zone, about 245° C. in the barrel and about 240° C. at the die. A screw speed of about 300 rpm was used. Injection molded test specimens were made from pelletized extrudate using an Arburg injection molder (Model number 221-25-250). Injection temperatures and pressures of about 260° C. to about 280° C. and about 800 psig to about 1000 psig, respectively, were employed during the processing

TABLE 10

| Sample[c] | Block Copolymer | Functionality (% w) | Neutralization (%) | Metal Counterion | Flexural Modulus (Kpsi) | ⅛" Dry as Molded Notched Izod Impact Toughness (ft-lb/in) | | |
|---|---|---|---|---|---|---|---|---|
| | | | | | | RT[b] | −20° F. | −40° F. |
| 01 | — | — | — | — | 335 | 0.9 | 0.8 | 0.7 |
| 07 | C | — | — | — | 230 | 2.9 | 1.3 | 1.2 |
| 10 | U1 | 0.40 | 25 | Li | — | >21.5[a] | — | — |
| 28 | W1 | 0.33 | 33 | Li | 190 | >21.3[a] | 2.0 | 1.6 |
| 41 | V1 | 0.22 | 55 | Li | 213 | 3.1 | 1.3 | 1.2 |
| 20 | CC1 | 1.15 | 55 | Na | — | >20.2[a] | — | — |
| 21 | X1 | 1.18 | 49 | Li | 175 | >21.1[a] | 5.0 | 3.2 |
| 40 | H | 0.22 | 0 | — | 208 | 2.9 | 1.3 | 1.2 |
| 42 | V2 | 0.22 | 100 | Li | 213 | 5.6 | 1.3 | 1.2 |

[a]Ductile failure.
[b]Room Temperature.
[c]Except for "01", all samples were formulated as 70% PBT and 30% block copolymer. Samples "01"and "07"are controls. Samples "40", "41", and "42" having a functionality of 0.22% w were utilized to construct curve II on FIG. 2.

TABLE 11

| Sample[c] | Block Copolymer | Functionality (% w) | Neutralization (%) | Metal Counterion | Flexural Modulus (Kpsi) | ⅛" Dry as Molded Notched Izod Impact Toughness (ft-lb/in) | | |
|---|---|---|---|---|---|---|---|---|
| | | | | | | RT[b] | −20° F. | −40° F. |
| 24 | — | — | — | — | 406 | 0.5 | — | — |
| 25 | D[d] | — | — | — | 241 | 1.2 | — | — |
| 43 | Q | 0.1 | 0 | — | 244 | 2.0 | 0.7 | 0.7 |
| 44 | R | 0.5 | 0 | — | 255 | >18.1[a] | 1.2 | 1.2 |
| 45 | FF1 | 1.3 | 8 | Li | 262 | >15.0[a] | 1.7 | 1.4 |
| 46 | EE1 | 0.1 | 60 | Li | 257 | 2.0 | 0.7 | 0.7 |
| 18 | BB1 | 1.15 | 50 | Li | 246 | >18.2[a] | 1.1 | 1.0 |
| 22 | Z1 | 1.0 | 30 | Li | 242 | >21.3[a] | 1.0 | 1.0 |
| 39 | Z1[d] | 1.0 | 30 | Li | 242 | >21.0[a] | 1.5 | 1.1 |

[a] Ductile failure.
[b] Room Temperature (23° C.).
[c] Except for "24", "25" and "39", all samples were formulated at 80% PET and 20% block copolymer. "24" and "25" are controls. Samples "43" and "46" having a functionality of 0.1% w were utilized to construct curve I on FIG. 5. It should be noted that samples "43", "45" and "46" utilized diblock copolymers. However, these polymers are presently believed to be adequate for the purpose of generally determining a minimum effective functionality for super-toughening PET blends.
[d] "25" and "39" were formulated as 70% PET and 30% block copolymer and are presented herein for comparative purposes.

EXAMPLE 8

Effect of Different Polyesters on Blend Composition

In this example, the impact strengths and flexural moduli of molded test specimens of various polyester blend compositions were measured. Herein, at a fixed polyester to block copolymer ratio of 80:20, the measurements were performed on two different polyester systems. The polyesters utilized were PBT (Valox® 310 from General Electric) and PET (Cleartuf® 7207 CS from Goodyear). Additionally, the degree of neutralization was varied to measure the corresponding effect on these properties. Specimens utilizing only the respective polyester and a 80:20 ratio of polyester to unmodified block copolymer were prepared as controls.

operation.

For PBT blends, the extruder melt temperature profile was about 230° C. in the feed zone, about 240° C. in the barrel and about 240° C. at the die. A screw speed of about 300 rpm was used. Injection molded test specimens were made from pelletized extrudate using an Arburg injection molder (Model number 221-55-250). Injection temperatures and pressures of about 220° C. to about 240° C. and about 800 psig to about 1200 psig, respectively, were employed during the processing operations.

As is readily apparent from Table 12, the effect of the degree of neutralization of the modified block copolymer on the impact properties of a polyamide blend is dependent on the particular polyester and the level of —COOH present in the blend. At comparable carboxyl functionality level in the modified polymer, PET blends maintain superior impact properties over a wider range of neutralization levels than PBT blends (32 versus 23). Be that as it may, improvements in impact resistance are achieved throughout the entire range of neutralization levels regardless of the particular polyester(s) utilized in the blend (32 versus 01 and 06; 23 versus 24 and 25). Therefore, a variety of toughened polyester blends compositions differing in their respective degree of toughness may be achieved by varying (1) the polyester or mixtures thereof and/or (2) the level of functionality, the degree of neutralization, and/or modified polymer content, thereby effectively varying the level of carboxyl functional groups and/or —COOH present in the blend.

the measurements were performed on systems wherein the degree of neutralization was also varied. Specimens utilizing only PBT (01), PET (24), and a 70:30 ratio of PBT to unmodified triblock copolymer (07) were prepared as controls.

As is readily apparent from Table 13, the addition of the modified block copolymer regardless of molecular architecture and degree of neutralization increases the impact strength of the polyester. Furthermore and unexpectedly, modified diblock and modified triblock copolymers are substantially equivalent with respect to super-toughening polyester —be it PBT or PET. (PBT: "47" versus "16"; and PET: "44" and "45" versus "17," "22," "18," and "23"). Unmodified diblock copolymers (A-B) have not typically been regarded as impact prop-

TABLE 12

| Sample[c] | Polyester | Block Copolymer | Block Copolymer (% w) | Functionality (% w) | Neutralization (%) | Metal Counterion | Flexural Modulus (Kpsi) | ⅛" Dry as Molded Notched Izod Impact Toughness (ft-lb/in) | | |
|---|---|---|---|---|---|---|---|---|---|---|
| | | | | | | | | RT[b] | −20° F. | −40° F. |
| 01 | PBT | — | 0 | — | — | — | 335 | 0.9 | 0.8 | 0.7 |
| 06 | PBT | C | 20 | — | — | — | 280 | 2.2 | 1.2 | 1.2 |
| 07 | PBT | C | 30 | — | — | — | 230 | 2.9 | 1.3 | 1.2 |
| 14 | PBT | DD1 | 20 | 1.40 | 46 | Li | 220 | >18.0[a] | 2.6 | — |
| 31 | PBT | G | 20 | 0.4 | 0 | — | — | 2.0 | — | — |
| 09 | PBT | U1 | 20 | 0.4 | 25 | Li | — | >19.9[a] | — | — |
| 32 | PBT | U2 | 20 | 0.4 | 100 | Li | — | 4.3 | — | — |
| 24 | PET | — | 0 | — | — | — | 406 | 0.5 | — | — |
| 25 | PET | D | 30 | — | — | — | 241 | 1.2 | — | — |
| 18 | PET | BB1 | 20 | 1.15 | 50 | Li | 246 | >18.2[a] | 1.1 | 1.0 |
| 17 | PET | N | 20 | 1.15 | 0 | — | 208 | >21.1[a] | — | — |
| 22 | PET | Z1 | 20 | 1.0 | 30 | Li | 242 | >21.3[a] | 1.0 | 1.0 |
| 23 | PET | Z2 | 20 | 1.0 | 80 | Li | 216 | >15.9[a] | — | — |

[a] Ductile failure.
[b] Room Temperature.
[c] Samples "01", "06", "07", "24" and "25" are controls.

EXAMPLE 9

Effect of Molecular Architecture of Modified Block Copolymer on Blend Compositions In this example, the impact strengths and flexural moduli of molded test specimens of various polyester blend compositions were measured. Herein, at a fixed PET (Cleartuf® 7202 CS) to block copolymer ratio of 80:20 and at a fixed PBT (Valox® 310) to block copolymer ratio of 70:30, the molecular architecture of the modified block copolymer was varied to measure the corresponding effect on these properties. Furthermore, erty improvers due to their inherent inability to form a physically cross-linked network within itself as do triblock copolymers (A-B-A). Thus, selection and/or blending of various modified block copolymers provide another means of controlling the impact modification of the respective polyester(s).

TABLE 13

| Sample[c] | Polyester | Block Copolymer | Block Copolymer (% w) | Functionality (% w) | Neutralization (%) | Metal Counterion | Flexural Modulus (Kpsi) | ⅛" Dry as Molded Notched Izod Impact Toughness (ft-lb/in) | | |
|---|---|---|---|---|---|---|---|---|---|---|
| | | | | | | | | RT[b] | −20° F. | −40° F. |
| 01 | PBT | — | 0 | — | — | — | 335 | 0.9 | 0.8 | 0.7 |
| 07 | PBT | C | 30 | — | — | — | 230 | 2.9 | 1.3 | 1.2 |
| 16 | PBT | DD1 | 30 | 1.40 | 46 | Li | 176 | >19.9[a] | 4.1 | — |
| 47 | PBT | GG1 | 30 | 2.60 | 52 | Li | 210 | >18.8[a] | 3.0 | 2.5 |
| 24 | PET | — | 0 | — | — | — | 406 | 0.5 | — | — |
| 17 | PET | N | 20 | 1.15 | 0 | — | 208 | >21.1[a] | — | — |
| 22 | PET | Z1 | 20 | 1.0 | 30 | Li | 242 | >21.3[a] | 1.0 | 1.0 |
| 18 | PET | BB1 | 20 | 1.15 | 50 | Li | 246 | >18.2[a] | 1.0 | 1.0 |
| 23 | PET | Z2 | 20 | 1.0 | 80 | Li | 216 | >15.9[a] | — | — |
| 43 | PET | Q | 20 | 0.1 | 0 | — | 244 | 2.0 | 0.7 | 0.7 |
| 46 | PET | EE1 | 20 | 0.1 | 60 | Li | 257 | 2.0 | 0.7 | 0.7 |
| 44 | PET | R | 20 | 0.5 | 0 | — | 255 | >18.1[a] | 1.2 | 1.2 |
| 45 | PET | FF1 | 20 | 1.3 | 8 | Li | 262 | >15.0[a] | 1.7 | 1.4 |

[a] Ductile failure.
[b] Room Temperature.
[c] Samples "01", "24" and "07" are controls.

EXAMPLE 10

Effect of Phase Size on Blend Properties

In this example, the sensitivity of polyester blend properties to the phase size of the block copolymer therein was evaluated. The formulations utilized were those indicated in Table 14.

A review of the results shown in Table 14 demonstrate the interplay of the various variables involved in super-toughening the respective polyester blends. These variables are block copolymer content (% w based on block copolymer plus polyester), carboxyl group functionality (% w based on the respective block copolymer), neutralization level (% of carboxyl functional groups), and phase size.

As earlier indicated, the minimum amount of carboxyl group functionality effective in super-toughening PBT and PET blends is at least about 0.25% w. For example, see samples "43" and "44" in Table 14. Though samples "08," "26," and "29" meet this limitation, these samples are not super-tough. Sample "08" does not have the minimum required block copolymer content of 14% w (about 15% w). Samples "26" and "29" do not have the required neutralization level for super-toughening PBT (between about 5% to about 85% neutralization; for PET: between about 0% to about 80% neutralization).

Phase size, whether it be the cross-sectional area of a section (cell) of a continuous phase or the diameter of a discrete particle, has been enumerated as a variable affecting the super-toughening of polyesters. At this point, it should be noted that high sheer (twin screw) extruders were utilized during blending operations herein. Thus, it is foreseeable that under low sheer conditions improper blending of the polyester and block copolymer phases may result in a reduction, if not negation, of these super-tough properties. From Table 14, it is observed that phase sizes ranging from about 0.48 μm to about 0.7 μm are effective in super-toughening PBT blends and from about 0.25 μm to about 0.5 μm are effective in super-toughening PET blends. Thus, it is presently believed that the effective phase size for super-toughening PBT blend ranges from about 0.4 μm to about 0.7 μm and for super-toughening PET blends range from about 0.2 μm to about 0.5 μm. Herein, phase size was determined by one of two methods. The first and preferred method is scanning transmission electron microscopy (STEM) of microtoned ruthenium oxide (RuO$_4$) stained samples. The stain darkens the styrene microphase of the block copolymer. Alternatively, phase size was determined by STEM on THF extracted freeze fractured films.

With these effective phase size ranges in mind, it is noted that samples "08" and "43" are not super-tough. However, sample "08" does not meet the effective block copolymer content required for super-toughening polyester blends. Additionally, sample "43" does not meet the effective amount of carboxyl functionality for super-toughening the polyester blends. Thus, it is quite apparent from the foregoing that the smallest phase size does not by itself always give the best results with respect to super-toughening.

As an additional observation, it is noted that as the neutralization level is increased at a fixed functionality level, there is a corresponding reduction in the phase size of the block copolymer. (See samples "26", "27" and "29" in Table 14). Furthermore, at comparable neutralization levels, it also appears that as carboxyl group functionality increases there is a corresponding reduction in the phase size of the block copolymer ("27" versus "09" and "45" versus "44"). Finally, as between the modified block copolymer and the unmodified (base) block copolymer, there again is a corresponding reduction of phase size of the block copolymer when the modified block copolymer is incorporated into the blend as opposed to the unmodified block copolymer. (See Table 14 generally.)

Thus, phase size provides another means for controlling the impact modification of the polyester.

TABLE 14

| Sample[d] | Polyester | Block Copolymer | Block Copolymer[e] (% w) | Functionality (% w) | Neutralization (%) | Metal Counterion | Phase Size(μm[f]) Mean | Phase Size(μm[f]) Sm/Lg | ⅛" Dry as Molded Notched Izod Impact Toughness (ft-lb/in) RT[b] | ⅛" Dry as Molded Notched Izod Impact Toughness (ft-lb/in) −20° F. | ⅛" Dry as Molded Notched Izod Impact Toughness (ft-lb/in) −40° F. |
|---|---|---|---|---|---|---|---|---|---|---|---|
| 02 | PBT | A | 10 | — | — | — | 6.3 | 5/17 | 0.9 | — | — |
| 03 | PBT | A | 20 | — | — | — | 4.0 | 3/12 | 1.4 | — | — |
| 04 | PBT | A | 30 | — | — | — | 6.7 | 5/20 | 1.7 | — | — |
| 07 | PBT | C | 30 | — | — | — | 1.2 | 0.1/10 | 2.9 | 1.3 | 1.2 |
| 08 | PBT | U1 | 10 | 0.40 | 25 | Li | 0.5 | 0.3/1.6 | 2.0 | — | — |
| 09 | PBT | U1 | 20 | 0.40 | 25 | Li | 0.7 | 0.4/2.5 | >19.9[a] | — | — |
| 10 | PBT | U1 | 30 | 0.40 | 25 | Li | 0.7 | 0.4/2.0 | >21.5[a] | — | — |
| 26 | PBT | L | 30 | 1.39 | 0 | — | 1.1 | 0.1/4.0 | 3.8 | 1.0 | 0.8 |
| 27 | PBT | Y1 | 30 | 1.39 | 19 | Li | 0.48 | 0.05/1.6 | >20.4[a] | 3.2 | 2.4 |
| 29 | PBT | Y2 | 30 | 1.39 | 100 | Li | 0.33 | 0.05/2.5 | 5.4 | 1.7 | 1.4 |
| 44 | PET | R | 20 | 0.5 | 0 | — | 0.50 | — | >18.1[a] | 1.2 | 1.2 |
| 18 | PET | BB1 | 20 | 1.15 | 50 | Li | 0.45 | — | >18.2[a] | 1.1 | 1.0 |
| 45 | PET | FF1 | 20 | 1.3 | 8 | Li | 0.25 | — | >15.0[a] | 1.7 | 1.4 |
| 43 | PET | Q | 20 | 0.1 | 0 | — | 0.30 | — | 2.0 | 0.7 | 0.7 |

[a]Ductile failure (no break).
[b]Room Temperature (23° C.).
[c]SM - Smallest phase size observed; Lg - Largest phase size observed.
[d]Samples "02", "03", "04" and "07" are controls. Samples "43", "44" and "45" utilized modified diblock copolymers.
[e]Polyester makes up the remainder.
[f]Phase size on samples 7, 8, 9 and 10 dtermined by STEM on THF extracted freeze fractured films.

EXAMPLE 11

Effect of Heat and UV Aging

In this example, the sensitivity of the polyester blend compositions of the present invention to heat and ultraviolet light (UV) were evaluated. For testing purposes, the composition was a 70:30 ratio of polyester (PBT, Valox ® 310) to block copolymer "DD1", which contains 1.4% w carboxyl functional groups of which 46% are neutralized with lithium ions.

The following test methods were utilized for heat and UV aging, respectively:

Heat Aging:

Test specimens were exposed in an air circulating oven for 72 hours at 150° C. This procedure is based on the General Motors test GM-7001-M for heat resistance of plastic molding compounds.

UV Aging:

Test specimens were exposed in a carbon arc weatherometer to a cycle which includes UV light, heat, and water spray for 360 hours. This is a version of the sunlight resistance test listed in UL 1581. Cam #7 was used to control the water spray cycle. As is readily apparent from Table 15, the polyester blends of the present invention are able to maintain their properties (impact resistance) even after severe heat and UV aging. Such is particularly true of the super-tough properties of the PBT blends of the present invention. ("48" and "49" versus "16.")

TABLE 15

| Sample[c] | Block Copolymer | Aging Method | ⅛" Dry as Molded Notched Izod Impact Toughness (ft-lb/in) | | |
|---|---|---|---|---|---|
| | | | RT[b] | −20° F. | −40° F. |
| 01 | — | — | 0.9 | 0.8 | 0.7 |
| 16 | DD1 | — | >19.9[a] | 4.1 | — |
| 48 | DD1 | Heat | >17.9[a] | >5.3[a] | — |
| 49 | DD1 | UV | >19.2[a] | 2.4 | — |

[a]Ductile failure.
[b]Room Temperature (23° C.).
[c]Samples "48" and "49" contain 0.5% w Irganox ® 1010, a phenolic antioxidant available from Ciba Geigy.

EXAMPLE 12

Effect of Carboxyl Functional Group Graft Location

In this example, the sensitivity of a particular polyester blend composition to the graft location of the carboxyl functional group (i.e., grafting in the alkenyl arene block versus the selectively hydrogenated conjugated diene block) was evaluated. The composition was of a 70:30 ratio of polyester (PBT, Valox ® 310) to a partially neutralized modified block copolymer. The results are tabulated in Table 16.

Three types of modified block copolymers were utilized. One of these is the modified block copolymers utilized in the present invention, i.e., grafted in the alkenyl arene blocks of the block copolymer. The other two were modified by grafting maleic anhydride and acrylic acid to the conjugated diene block, respectively prepared as follows:

COMPARATIVE POLYMER 1 (CP1)

Maleic Anhydride Grafted

The base block copolymer "D" was extruder functionalized with 1.2% w bound maleic anhydride by the method disclosed in U.S. Pat. No. 4,578,429, wherein maleic anhydride is grafted to the selectively hydrogenated conjugated diene block of the copolymer "D" via a free radically initiated reaction. Thereafter, one pound of the maleic anhydride grafted block copolymer product was dissolved in THF to form a one gallon solution. Next, lithium hydroxide dissolved in 100 ml of water was added thereto. 10:1 molar equivalents of lithium hydroxide to bound maleic anhydride were used. The partically neutralized maleic anhydride grafted polymer (CP1) was coagulated into water, and then water washed to ph7 to remove unreacted lithium hydroxide. Water was then removed by vacuum drying. An infrared spectrum of the polymer (CP1) showed a broad salt band at 1550-1600 cm$^{-1}$, but did not exhibit either maleic anhydride or maleic acid peaks to any appreciable extent. These peaks are found at 1790 cm$^{-1}$ and 1750 cm$^{-1}$, respectively. Titration with potassium methoxide (as earlier disclosed herein) indicated that about 78% of the acid groups (—COOH) had been neutralized. This partially neutralized polymer (CP1) as extruder blended with PBT (Valox ® 310) according to the procedure disclosed herein at a 70:30 ratio of polyester to block copolymer. Except for the low residual ethylenic unsaturation in the base block copolymer and the utilization of high shear extruders (twin screw) in both the grafting and blending stages, such blends are similar to those of Shiraki et al (U.S. Pat. No. 4,657,971). This comparative blend (CB1) had a ⅛ inch notched izod at room temperature of only 1.1 ft-lb/in.

COMPARATIVE POLYMER 2 (CP2)

Acrylic Acid Grafted

The base block copolymer "D" was extruder functionalized with 1.6% w bound acrylic acid by the method disclosed in U.S. Pat. No. 4,578,429, wherein acrylic acid is grafted to the selectively hydrogenated conjugated diene block of the copolymer "D" via a free radically initiated reaction. Unbound acrylic acid was removed from this polymer by precipitating a cyclohexane solution of it into IPA (isopropyl alcohol). Thereafter, 300 grams of this polymer was redissolved in cyclohexane to make a one gallon solution. Next, 1.4 grams of lithium hydroxyide dissolved in 30 ml of water was added to the polymer solution. The partially neutralized polymer (CP2) was precipitated into IPA and then vacuum dried. An infrared spectrum of the polymer (CP2) showed a broad salt band centered at approximately 1600 cm$^{-1}$. Titration with potassium methoxide (as earlier disclosed hrein) indicated that about 62% of the acid groups (—COOH) had been neutralized. This partially neutralized polymer (CP2) was extruder blended with PBT (Valox ® 310) according to the procedure disclosed herein at a 70:30 ratio of polyester to block copolymer. Again, except for the low residual ethylenic unsaturation in the base block copolymer and the utilization of high shear extruders (twin screw) in both the grafting and blending steps, such blends are similar to those of Shiraki et al. (U.S. Pat. No. 4,657,971). This comparative blend (CB2) had a ⅛ inch notched izod at room temperature of only 2.9 ft-lb/in.

Comparison

Thus, as is readily apparent in Table 16, the neutralization effect which manifests itself in PBT blends with carboxyl functional groups grafted to the alkenyl arene blocks of the polymers herein does not manifest itself in PBT blends with carboxyl functional groups grafted to the selectively hydrogenated conjugated diene blocks of the same base block copolymer. Therefore, the blends of the present invention are truly distinct and unique. Furthermore, the super-tough PBT blends of the present invention are also unique and unexpected.

TABLE 16

| Sample | Base Block Copolymer | Location of Functionality[c] | Type of Functionality | Functionality (% w) | No. of Carboxyl Groups per Base Copolymer Molecule | Neutralization (%)[e] | Metal Counterion | Room Temperature[b] ⅛" Notched Izod Impact Toughness (ft-lb/in) |
|---|---|---|---|---|---|---|---|---|
| CP1 | D | B | Grafted Maleic Anhydride | 1.2 | 12.6 | 78 | Li | 1.1 |
| CP2 | D | B | Grafted Acrylic Acid | 1.6 | 11.4 | 62 | Li | 2.9 |
| 20 | D | A | Carboxyl Group | 1.15 | 13.2 | 55 | Na | >20.2[a] |
| 16 | D | A | Carboxyl Group | 1.4 | 16.0 | 46 | Li | >19.9[a] |
| 21 | C | A | Carboxyl Group | 1.18 | 13.0 | 49 | Li | >21.1[a] |
| 27 | C | A | Carboxyl Group | 1.39 | 15.4 | 19 | Li | >20.4[a] |
| 28 | B | A | Carboxyl Group | 0.33 | 13.3 | 33 | Li | >21.3[a] |
| 10 | A | A | Carboxyl Group | 0.40 | 5.9 | 25 | Li | >21.5[1] |

[a]Ductile failure.
[b]Room Temperature (23° C.).
[c]B - selectively hydrogenated conjugated diene block; A - alkenyl arene block.
[d]Based on base block copolymer.
[e]Percent of total carboxyl functional groups which have been ionized by neutralization with a metal ion.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A super-toughened multiphase thermoplastic composition comprising:
   (a) one phase containing a thermoplastic polyester, said polyester being poly(ethylene terephthalate); and
   (b) at least one other phase containing an effective amount of at least one functionalized, selectively hydrogenated block copolymer for super-toughening said composition,
   (c) said functionalized block copolymer having grafted thereto on the average an effective amount of carboxyl functional groups for super-toughening said composition,
   (d) said carboxyl functional groups, being present as carboxylate salts and carboxylic acids in an effective ratio of salt to acid for super-toughening said composition,
   (e) said at least one other phase having an effective phase size for super-toughening said composition, and
   (f) said functionalized block copolymer comprising
       (1) a base block copolymer which comprises
           (i) at least one polymer block A, said A block being predominantly a polymerized alkenyl arene block, and
           (ii) at least one selectively hydrogenated polymer block B, said B block prior to hydrogenation being predominantly a polymerized conjugated diene block,
       (2) wherein substantially all of said carboxyl functional groups are grafted to said base block copolymer on said A blocks.

2. The composition according to claim 1, wherein said effective amount of said functionalized block copolymer is from about 15 to about 50 percent by weight based on (a) plus (b).

3. The composition according to claim 2, wherein said at least one functionalized block copolymer is present in said composition from about 15 to about 40 percent by weight based on (a) plus (b).

4. The composition according to claim 3, wherein said at least one functionalized block copolymer is present in said composition from about 15 to about 30 percent by weight based on (a) plus (b).

5. The composition according to claim 1, wherein said effective amount of said carboxyl functional groups is at least about 0.25 percent by weight based on said base block copolymer.

6. The composition according to claim 1, wherein said carboxyl functional groups are present on the average from
about 0.25 percent by weight based on said base block copolymer to
about one of said carboxyl functional groups per aromatic ring of said A blocks.

7. The composition according to claim 6, wherein said carboxyl functional groups are present on the average from about 0.25 to about 20 percent by weight based on said base block copolymer.

8. The composition according to claim 7, wherein said carboxyl functional groups are present on the average from about 0.25 to 10 percent by weight based on said base block copolymer.

9. The composition according to claim 8, wherein said carboxyl functional groups are present on the average from about 0.25 to about 5 percent by weight based on said base block copolymer.

10. The composition according to claim 1, wherein said effective ratio of salt to acid is from about 0:100 to about 95:5.

11. The composition according to claim 10, herein said effective ratio of salt to acid is from about 0:100 to about 90:10.

12. The composition according to claim 11, wherein said effective ratio of salt to acid is from about 0:100 to about 80:10.

13. The composition according to claim 1, wherein said effective phase size is from about 0.2 $\mu$m to about 0.5 $\mu$m.

14. The composition according to claim 1, wherein said carboxylate salts are metal carboxylate salts of at least one metal selected from the group consisting of metals capable of forming metal ions having a positive valence state.

15. The composition according to claim 14, wherein said metal ions are selected from the group consisting of uncomplexed and complexed metal ions.

16. The composition according to claim 1, wherein said functionalized block copolymer is characterized as having been prepared by the process which comprises
metalating said base block copolymer, and
reacting the resulting metalated base block copolymer with effective amounts of at least one graftable electrophilic molecule containing at least one of said carboxyl functional groups or with effective amounts of an electrophile, wherein said electrophile is carbon dioxide, thereby preparing said functionalized block copolymer.

17. The composition according to claim 1, wherein said functionalized block copolymer has a branched structure.

18. The composition according to claim 1, wherein said functionalized block copolymer has a linear structure.

19. The composition according to claim 1, wherein
   (g) each of said A blocks prior to hydrogenation is predominatly a polymerized monoalkenyl monocyclic arene block having an average molecular weight of about 1,000 to about 125,000,
   (h) each of said B blocks prior to hydrogenation is predominantly a polymerized conjugated diene block having an average molecular weight of about 10,000 to about 450,000,
   (j) said A blocks constituting about 1 to about 99 percent by weight of said base block copolymer,
   (k) the residual ethylenic unsaturation of said B block is less than about 10 percent of the ethylenic unsaturation of said B blocks prior to hydrogenation, and
   (l) the residual aromatic unsaturation of said A blocks is greater than about 50 percent of the aromatic unsaturation of said A block prior to hydrogenation.

20. The composition according to claim 19, wherein said A blocks constitute about 2 to about 60 percent by weight of said base block copolymer.

21. The composition according to claim 20, wherein said A blocks constitute about 2 to about 55 percent by weight of said base block copolymer.

22. The composition according to claim 21, wherein said A blocks constitute about 2 to about 40 percent by weight of said base block copolymer.

23. The composition according to claim 19, wherein prior to hydrogenation:
   (a) said A block is polymerized styrene and
   (b) said B block is selected from the group consisting of polymerized isoprene, polymerized butadiene, and polymerized isoprene and butadiene copolymer.

24. The composition according to claim 23, wherein said B block is polymerized butadiene block having a 1,2 content of between about 35 percent and about 55 percent.

25. The composition according to claim 24, wherein said polymerized butadiene block has an average molecular weight of between about 10,000 to about 150,000.

26. The composition according to claim 25, wherein the residual ethylenic unsaturation of said polymerized butadiene block is less than 5 percent of the ethylenic unsaturation present prior to hydrogenation.

27. The composition according to claim 26, wherein the residual ethylenic unsaturation of said polymerized butadiene block is at most 2 percent of the ethylenic unsaturation present prior to hydrogenation.

28. The composition according to claim 27, wherein on the average the aromatic unsaturation of said A blocks is greater than about 90 percent of the aromatic unsaturation of said A block prior to hydrogenation.

29. The composition according to claim 28, wherein said polymerized styrene block has an average molecular weight of between about 1,000 and about 60,000.

30. The composition according to claim 29, wherein prior to functionalization said copolymer is a polystyrene-poly(ethylene/butylene)-polystyrene block copolymer.

31. The composition according to claim 29, wherein prior to functionalization said copolymer is a polystyrene-poly(ethylene/butylene) diblock copolymer.

32. The composition according to claim 23, wherein said B block is a polymerized isoprene block.

33. The composition according to claim 32, wherein said polymerized isoprene block has an average molecular weight of between about 10,000 to about 150,000.

34. The composition according to claim 33, wherein the residual ethylenic unsaturation of said polymerized isoprene block is less than about 5 percent of the ethylenic unsaturation present prior to hydrogenation.

35. The composition according to claim 34, wherein the residual ethylenic unsaturation of said polymerized isoprene block is at most about 2 percent of the ethylenic unsaturation present prior to hydrogenation.

36. The composition according to claim 35, wherein on the average the aromatic unsaturation of said A blocks is greater than about 90 percent of the aromatic unsaturation of said A blocks prior to hydrogenation.

37. The composition according to claim 36, wherein prior to functionalization said block copolymer is a polystyrene-poly(ethylene/propylene)-polystyrene block copolymer.

38. The composition according to claim 36, wherein prior to functionalization said block copolymer is a polystyrene-poly(ethylene/propylene) diblock copolymer.

39. The composition according to claim 14, wherein said metal ions are selected from the group consisting of monovalent metal ions, divalent metal ions, trivalent metal ions and combinations thereof.

40. The composition according to claim 39, wherein said metal ions are selected from the group consisting of monovalent metal ions and combinations thereof.

41. The composition according to claim 40, wherein said metal ions are lithium ions.

42. The composition according to claim 40, wherein said metal ions are sodium ions.

43. The composition according to claim 39, wherein said metal ions are zinc ions.

* * * * *